(12) United States Patent
Yen et al.

(10) Patent No.: US 11,112,054 B2
(45) Date of Patent: Sep. 7, 2021

(54) ELEVATABLE SUPPORTING DEVICE

(71) Applicant: SYNCMOLD ENTERPRISE CORP., New Taipei (TW)

(72) Inventors: Ching-Hui Yen, New Taipei (TW); Chien-Cheng Yeh, New Taipei (TW); Chun-Hao Huang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 83 days.

(21) Appl. No.: 16/677,953

(22) Filed: Nov. 8, 2019

(65) Prior Publication Data

US 2020/0149677 A1 May 14, 2020

Related U.S. Application Data

(60) Provisional application No. 62/758,034, filed on Nov. 9, 2018.

(51) Int. Cl.
| *F16M 11/04* | (2006.01) |
| *F16M 11/18* | (2006.01) |
| *F16M 11/24* | (2006.01) |

(52) U.S. Cl.
CPC ........... *F16M 11/046* (2013.01); *F16M 11/18* (2013.01); *F16M 11/24* (2013.01); *F16M 2200/028* (2013.01); *F16M 2200/047* (2013.01)

(58) Field of Classification Search
CPC ........ F16M 11/10; F16M 11/18; F16M 11/24; F16M 11/26; F16M 11/30; F16M 11/2014; F16M 2200/022; F16M 2200/041; F16M 2200/045; F16M 2200/047; F16M 2200/048; F16M 13/022
See application file for complete search history.

(56) References Cited

U.S. PATENT DOCUMENTS

| 5,246,191 A | * | 9/1993 | Moss | ................. | A47B 21/0371 |
| | | | | | 248/118.3 |
| 6,026,755 A | * | 2/2000 | Long | ....................... | A47B 9/02 |
| | | | | | 108/147 |
| 6,796,537 B1 | * | 9/2004 | Lin | ....................... | F16M 11/30 |
| | | | | | 248/127 |

(Continued)

*Primary Examiner* — Eret C McNichols
(74) *Attorney, Agent, or Firm* — Muncy, Geissler, Olds & Lowe, P.C.

(57) ABSTRACT

An elevatable supporting device for bearing a display is provided. The elevatable supporting device comprises an upright, an energy storage element, and a bearing module. The upright includes a first sliding structure and a second sliding structure which is non-parallel to the first sliding structure. The energy storage element abuts against the first sliding structure and the second sliding structure and includes a first arm providing a first resistance and a second arm providing a second resistance. A first included angle is defined between the first arm and the second arm. When the energy storage element moves from the highest position to the lowest position, the first included angle decreases so that one of the first resistance and the second resistance may increase in order to maintain a total effective resistance along the first axis. Accordingly, the display may be able to stop at any position between the highest position and the lowest position.

19 Claims, 20 Drawing Sheets

(56) References Cited

U.S. PATENT DOCUMENTS

| | | | |
|---|---|---|---|
| 6,994,306 B1* | 2/2006 | Sweere | F16M 11/10 248/295.11 |
| 7,032,870 B2* | 4/2006 | Sweere | F16M 11/10 248/295.11 |
| 7,506,853 B2 | 3/2009 | Sweere et al. | |
| 7,708,243 B2* | 5/2010 | Wang | F16M 11/105 248/157 |
| 7,971,846 B2* | 7/2011 | Hardtke | F16L 3/2056 248/584 |
| 8,056,877 B2* | 11/2011 | Wang | F16M 11/24 248/414 |
| 8,201,784 B2* | 6/2012 | Tang | F16M 11/10 248/162.1 |
| 8,313,074 B2* | 11/2012 | Wang | F16M 11/105 248/295.11 |
| 8,405,959 B2* | 3/2013 | Lee | F16M 11/046 361/679.01 |
| 9,046,216 B2* | 6/2015 | Lu | F16M 11/24 |
| 9,791,093 B2* | 10/2017 | Aoyagi | F16D 59/02 |
| 10,190,725 B2* | 1/2019 | Aoyagi | F16M 11/046 |
| 2004/0035989 A1* | 2/2004 | Sweere | F16M 11/105 248/127 |
| 2005/0145762 A1* | 7/2005 | Sweere | F16M 11/24 248/157 |
| 2007/0102600 A1* | 5/2007 | Ishizaki | F16M 11/105 248/176.3 |
| 2010/0294898 A1* | 11/2010 | Wang | F16M 11/10 248/122.1 |
| 2020/0132246 A1* | 4/2020 | Yen | F16M 11/18 |

\* cited by examiner

ELEVATABLE SUPPORTING DEVICE

CROSS REFERENCE TO RELATED APPLICATION

This application claims the benefit of U.S. Provisional Application Ser. No. 62/758,034 filed on Nov. 9, 2018. The entirety of the Application is incorporated herein by reference.

BACKGROUND OF THE INVENTION

1. Field of the Invention

The present invention relates to a supporting device, more particularly, to an elevatable supporting device for bearing a display.

2. Description of Related Art

U.S. Pat. No. 7,506,853 disclosed a supporting device for bearing a display, which includes a carrier, a sliding module, an upright, a base, and an energy storage element. The base is disposed on a working surface, the upright is disposed on the base and has a cam, the sliding module is disposed on the upright, and the carrier is disposed to connect to a display. The display and the carrier can move upward and downward with respect to the upright through the sliding module. When the display moves up and down, the energy storage element is actuated to slide along the curved surface of the cam and generates different supporting forces due to elastic changes in different positions to support the display. Specifically, when the energy storage element moves along the curved surface of the cam, the force generated between the energy storage element and the cam may change, and the force can be transfer to support the display by the cam. Accordingly, a single supporting device may be applied to displays with different sizes and weights. The storage element does not need to be adjusted or replaced when bearing displays with different sizes.

However, the conventional supporting device has the disadvantages of higher accuracy requirements of the curved surface of the cam and shorter lifetime of the energy storage element. Therefore, the present invention provides a novel supporting device having an energy storage element with two arms sliding up and down respectively against two non-parallel sliding structures to stabilize the supporting force for supporting the display.

SUMMARY OF THE INVENTION

The main object of the present invention is to provide an elevatable supporting device, wherein the elevatable supporting device utilizes a plurality of energy storage elements each having two arms that slide upwardly and downwardly between two non-parallel sliding structures to stabilize the supporting force for supporting the display, so that the display is capable of stopping at any position according to a user's adjustment.

The elevatable supporting device is advantageous of fewer components, simple operation principle, stable supporting force, and long-life energy storage element.

For achieving the aforementioned object, the present invention provides an elevatable supporting device for bearing a display. The elevatable supporting device comprises an upright, an energy storage unit, and a bearing module. The upright extends along a first axis and includes an accommodating space, a first sliding structure, and a second sliding structure non-parallel to the first sliding structure, wherein the accommodating space is formed between the first sliding structure and the second sliding structure, the first sliding structure includes a first sliding surface and a third sliding surface, the second sliding structure includes a second sliding surface and a fourth sliding surface, and a highest position and a lowest position are defined on the first axis. The energy storage unit is movably disposed in the accommodating space and abutting against the first sliding structure and the second sliding structure, the energy storage unit at least includes a first energy storage element having a first connecting section, a first arm extending from the first connecting section and providing a first resistance, and a second arm extending from the first connecting section and providing a second resistance; and a second energy storage element having a second connecting section, a third arm extending from the second connecting section and providing a third resistance, and a fourth arm extending from the second connecting section and providing a fourth resistance. The bearing module connects to the display and the energy storage unit and sliding back and forth along the first axis with respect to the upright.

Wherein a first included angle is defined between the first arm and the second arm, a second included angle is defined between the first arm and the first sliding surface, a third included angle is defined between the first sliding surface and the first axis, a fourth included angle is defined between the second arm and the second sliding surface, a fifth included angle is defined between the second sliding surface and the first axis, a sixth included angle is defined between the third arm and the fourth arm, a seventh included angle is defined between the third arm and the third sliding surface, an eighth included angle is defined between the fourth arm and the fourth sliding surface, a ninth included angle is defined between the third sliding surface and the first axis, and a tenth included angle is defined between the fourth sliding surface and the first axis; wherein the third included angle is constant and smaller than the first included angle, the ninth included angle is constant and smaller than the sixth included angle, the fifth included angle is constant and smaller than the first included angle, the tenth included angle is constant and smaller than the sixth included angle, and the sixth included angle is smaller than the first included angle. When the energy storage unit moves from the highest position to the lowest position, the first included angle and the sixth included angle continuously decrease so that the first resistance, the second resistance, the third resistance, and the fourth resistance continuously increase, at least one of the second included angle and the fourth included angle continuously decreases, and at least one of the seventh included angle and the eighth included angle continuously decreases. Conversely, when the energy storage element moves from the lowest position to the highest position, the first included angle and the sixth included angle continuously increase so that the first resistance, the second resistance, the third resistance, and the fourth resistance continuously decrease, at least one of the second included angle and the fourth included angle continuously increases, and at least one of the seventh included angle and the eighth included angle continuously increases. Thereby, a total effective resistance on the first axis is substantially constant, and when an external force is applied, the energy storage unit, the bearing module, and the display move simultaneously; whereas when the external force is removed, the energy storage element, the bearing module, and the display are in a static equilibrium status so that the display is able to stop at any position between the highest position and the lowest position.

A first interval on a second axis perpendicular to the first axis is defined between the first sliding surface and the second sliding surface, and a second interval on the second axis is defined between the third sliding surface and the fourth sliding surface, wherein a width of the first interval and a width of the second interval continuously decrease from the highest position to the lowest position.

A projected length of the first arm and a projected length of the third arm that projected on the first axis continuously increase from the highest position to the lowest position.

The first resistance forms a first effective resistance on the first axis, the second resistance forms a second effective resistance on the first axis, the third resistance forms a third effective resistance on the first axis, and the fourth resistance forms a fourth effective resistance on the first axis, wherein the total effective resistance comprises the first effective resistance, the second effective resistance, the third effective resistance and the fourth effective resistance.

The first energy storage element has a first follower disposed on the first arm and a second follower disposed on the second arm, and the second energy storage element has a third follower disposed on the third arm and a fourth follower disposed on the fourth arm, wherein the first follower and the third follower contact with the first sliding surface and the third sliding surface respectively, and the second follower and the fourth follower contact with the second sliding surface and the fourth sliding surface respectively.

In one embodiment, the upright has a sliding module disposed along the first axis, and the bearing module connects to the sliding module to slide with respect to the upright so that the first arm and the third arm slide along the first sliding surface and the third sliding surface respectively, and the second arm and the fourth arm slide along the second sliding surface and the fourth sliding surface respectively.

The bearing module connects to the first connecting section and the second connecting section.

In one embodiment, the first sliding surface and the second sliding surface are symmetrical with each other with respect to the first axis, and the third sliding surface and the fourth sliding surface are symmetrical with each other with respect to the first axis.

In another embodiment, the first sliding surface and the second sliding surface are non-symmetrical with each other with respect to the first axis, and the third sliding surface and the fourth sliding surface are non-symmetrical with each other with respect to the first axis, in which the second sliding surface and the fourth sliding surface are parallel to the first axis.

In one embodiment, the third included angle equals the ninth included angle, the fifth included angle equals the tenth included angle, the first sliding surface overlaps with the third sliding surface, and the second sliding surface overlaps with the fourth sliding surface.

In another embodiment, the first energy storage element and the second energy storage element are integrally-formed torsion springs respectively, wherein the first connecting section has a first winding portion, and the second connecting section has a second winding portion. The bearing module has a first shaft on which the first winding portion and the second winding portion are sleeved.

As an alternative, the bearing module has a first shaft on which the first winding portion is sleeved, and a second shaft on which the second winding portion is sleeved.

In another embodiment, the first energy storage element and the second energy storage element are integrally-formed V-shaped elastic steel plates respectively.

In one embodiment, the bearing module has a first shaft, a second shaft, a first block and a second block, wherein the first shaft and the first connecting section are secured to the first block and the second shaft and the second connecting section are secured to the second block.

In yet another embodiment, the first connecting section and the second connecting section are supporting blocks connecting to the bearing module respectively, wherein the first arm and the second arm partially attach to the first connecting section, and the third arm and the fourth arm partially attach to the second connecting section.

Wherein the first arm, the second arm, the third arm, and the fourth arm are flat springs respectively.

In a preferable embodiment, the bearing module further comprises a friction unit disposed adjacent to the upright for providing a normal force towards the upright, and a kinetic friction force is generated between the friction unit and the upright when the bearing module moves with respect to the upright.

The friction unit has a friction block and a screw abutting against the friction block towards the upright so that the normal force is able to be adjusted according to an extent of the screw abutting against the friction block.

DETAILED DESCRIPTION OF THE PREFERRED EMBODIMENT

Figure 1:
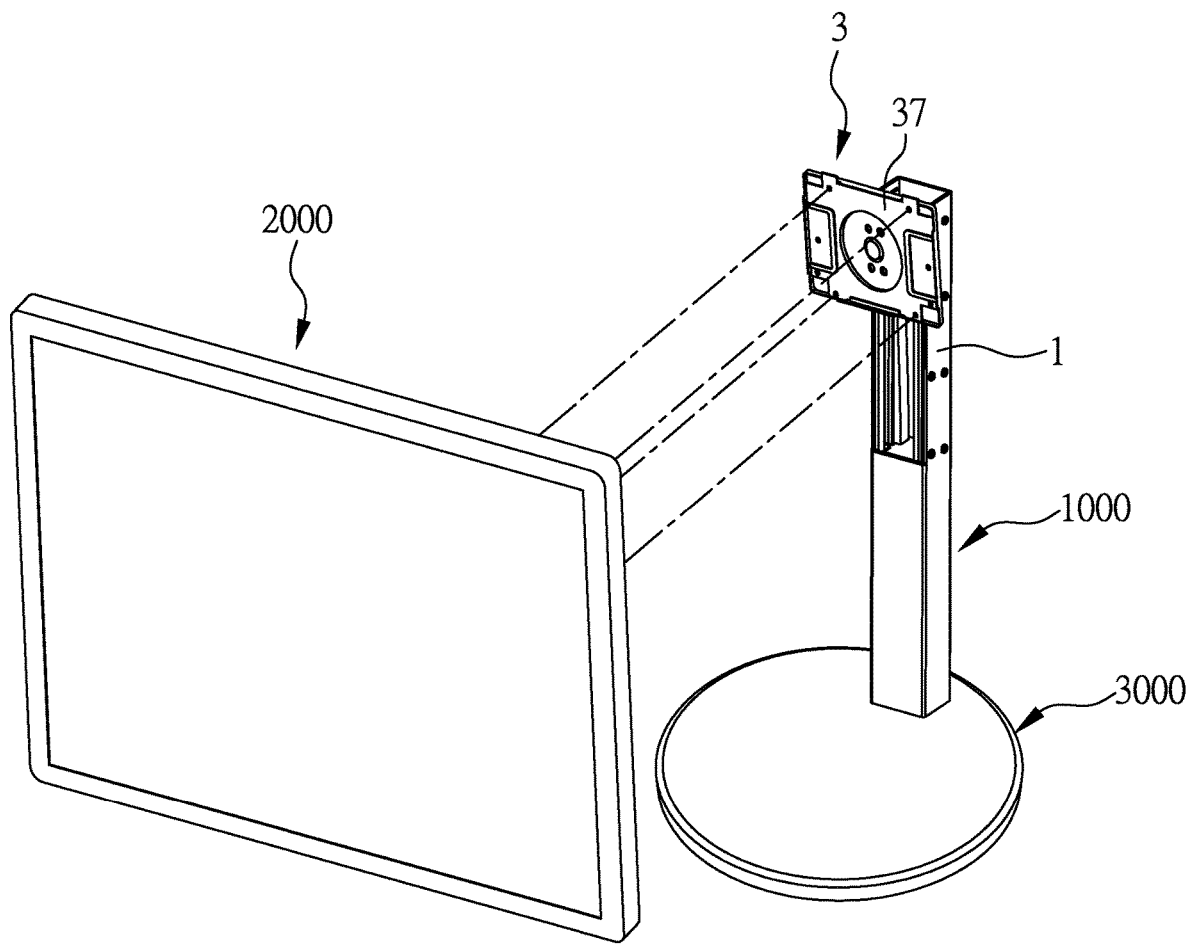
FIG. 1 is a perspective view of the elevatable supporting device connecting a base and a display of the first embodiment of the present invention.

Please refer to FIG. 1, which illustrates a perspective view of an elevatable supporting device 1000, a base 3000, and a display 2000 of the first embodiment of the present invention. The elevatable supporting device 1000 of the present invention is utilized for bearing the display 2000; however, the elevatable supporting device 1000 does not have to be connected to a base 3000. In other embodiments, the elevatable supporting device 1000 can be disposed onto a surface of a wall, on a desktop, or be connected to other devices, which is not particularly limited.

Figure 2:
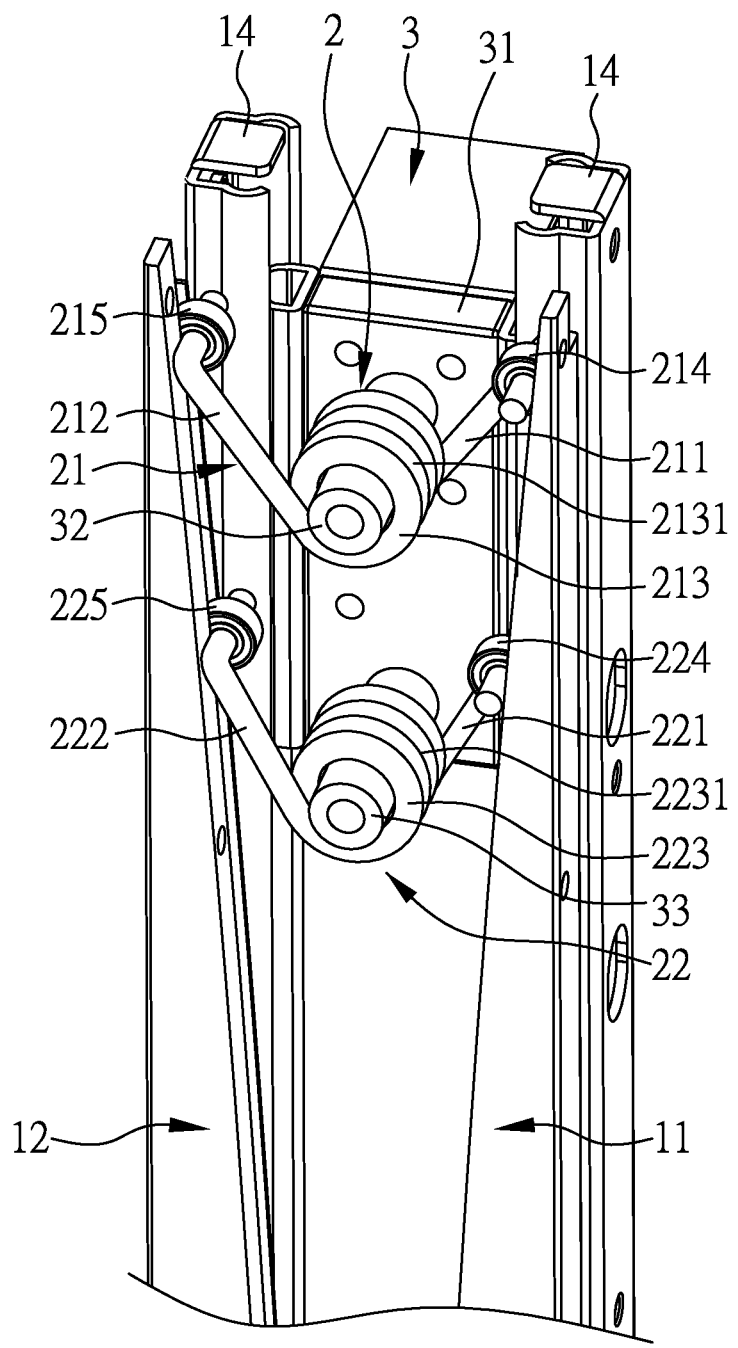
FIG. 2 is a rear partial perspective view of the elevatable supporting device of the first embodiment of the present invention.
Figure 3:
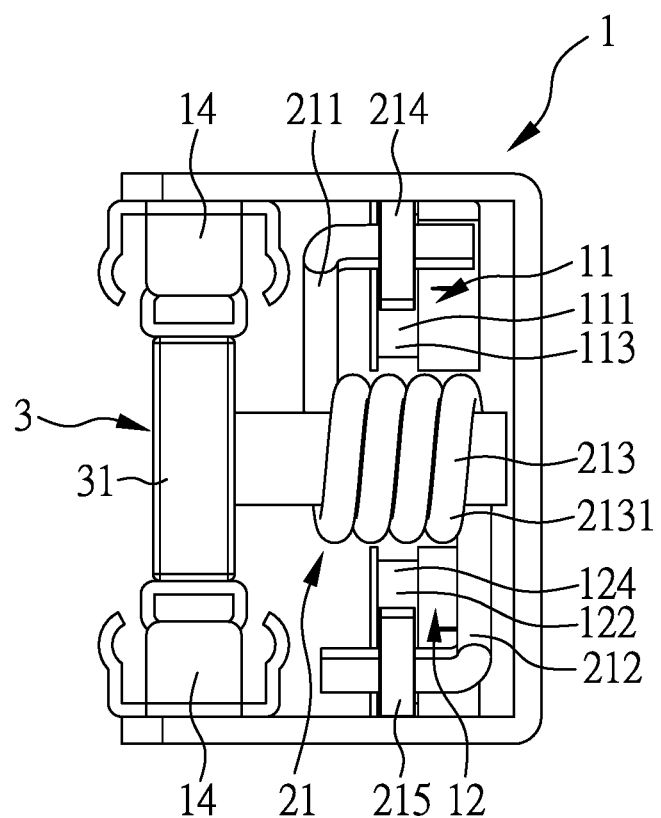
FIG. 3 is a top view of the elevatable supporting device of the first embodiment of the present invention.

Please refer to FIG. 2, FIG. 3, FIG. 4, and FIG. 5, which illustrate partial views and a top view of the elevatable supporting device 1000 of the first embodiment of the present invention. The elevatable supporting device 1000 comprises an upright 1, an energy storage unit 2, and a bearing module 3. The upright 1 extends along a first axis X and includes a first sliding structure 11, a second sliding structure 12 which is non-parallel to the first sliding surface 11, and an accommodating space 13 formed between the first sliding structure 11 and the second sliding structure 12. In the present embodiment, the upright 1 further includes a sliding module 14 disposed along the first axis X and being adjacent to the first sliding structure 11 and the second sliding structure 12. As illustrated in FIG. 3, the sliding module 14 includes two slide rails; therefore, the bearing module 3 can be slidably connected to the slide rails and slides back and forth along the first axis X with respect to the upright 1.

Furthermore, the energy storage unit 2 is disposed in the accommodating space 13. The bearing module 3 is connected between the display 2000 and the energy storage unit 2 and is actuated together therewith. The bearing module 3 includes a slider 31, a first shaft 32, a second shaft 33, and a board 37 (refer to FIG. 1). The slider 31 is connected to the sliding module 14, the first shaft 32 and the second shaft 33 are actuated together with the energy storage unit 2, and the board 37 is connected between the display 2000 and the slider 31. Accordingly, the energy storage unit 2 may slide along the first sliding structure 11 and the second sliding structure 12 while the bearing module 3 slides with respect to the upright 1 by the sliding module 14.

To specify the elevatable supporting device 1000 of the present invention, a highest position and a lowest position are defined on the first axis X, wherein the energy storage unit 2 illustrated in FIG. 2 is located at the highest position.

Figure 4:
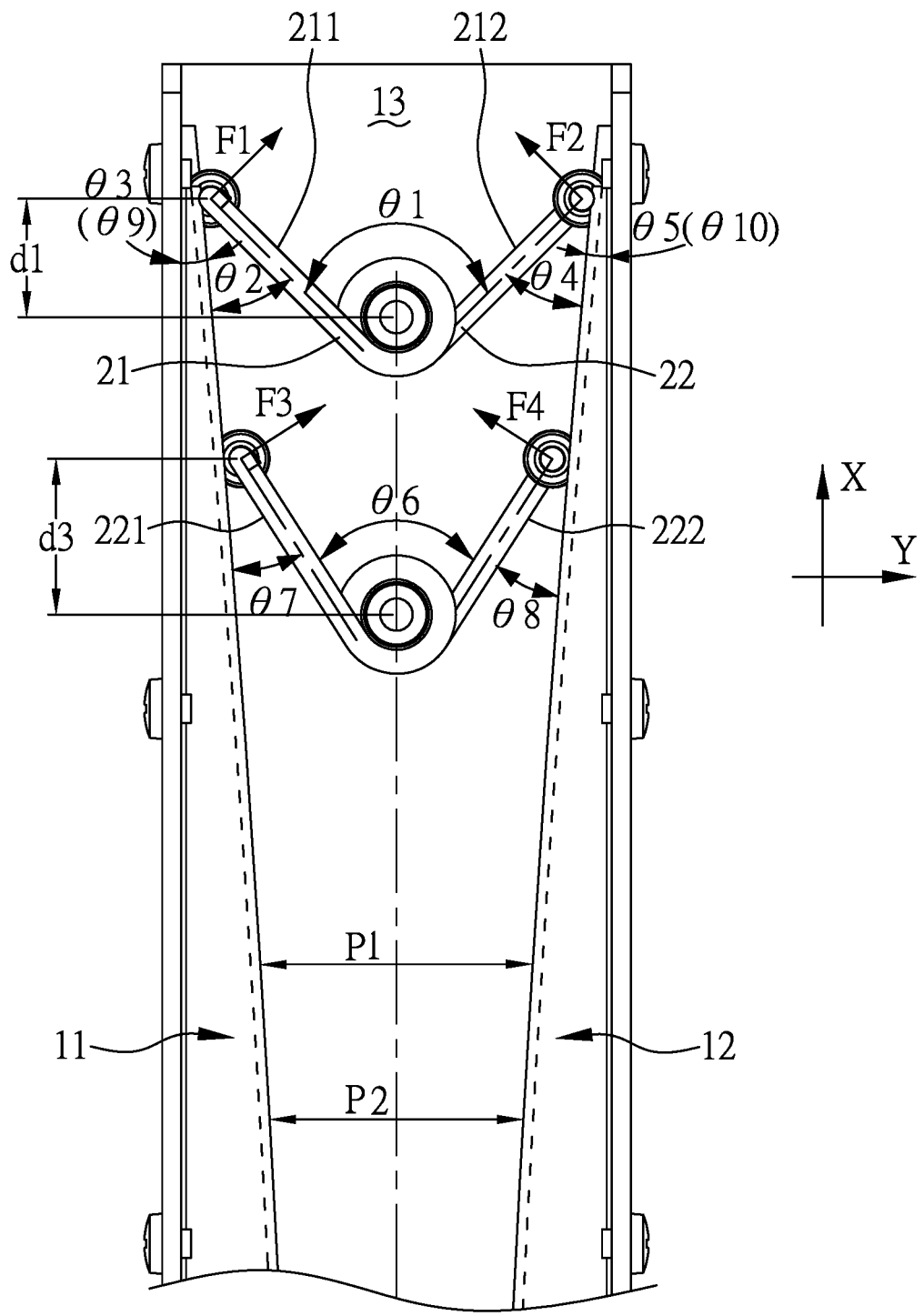
FIG. 4 is a schematic view of the highest position of the elevatable supporting device of the first embodiment of the present invention.
Figure 5:
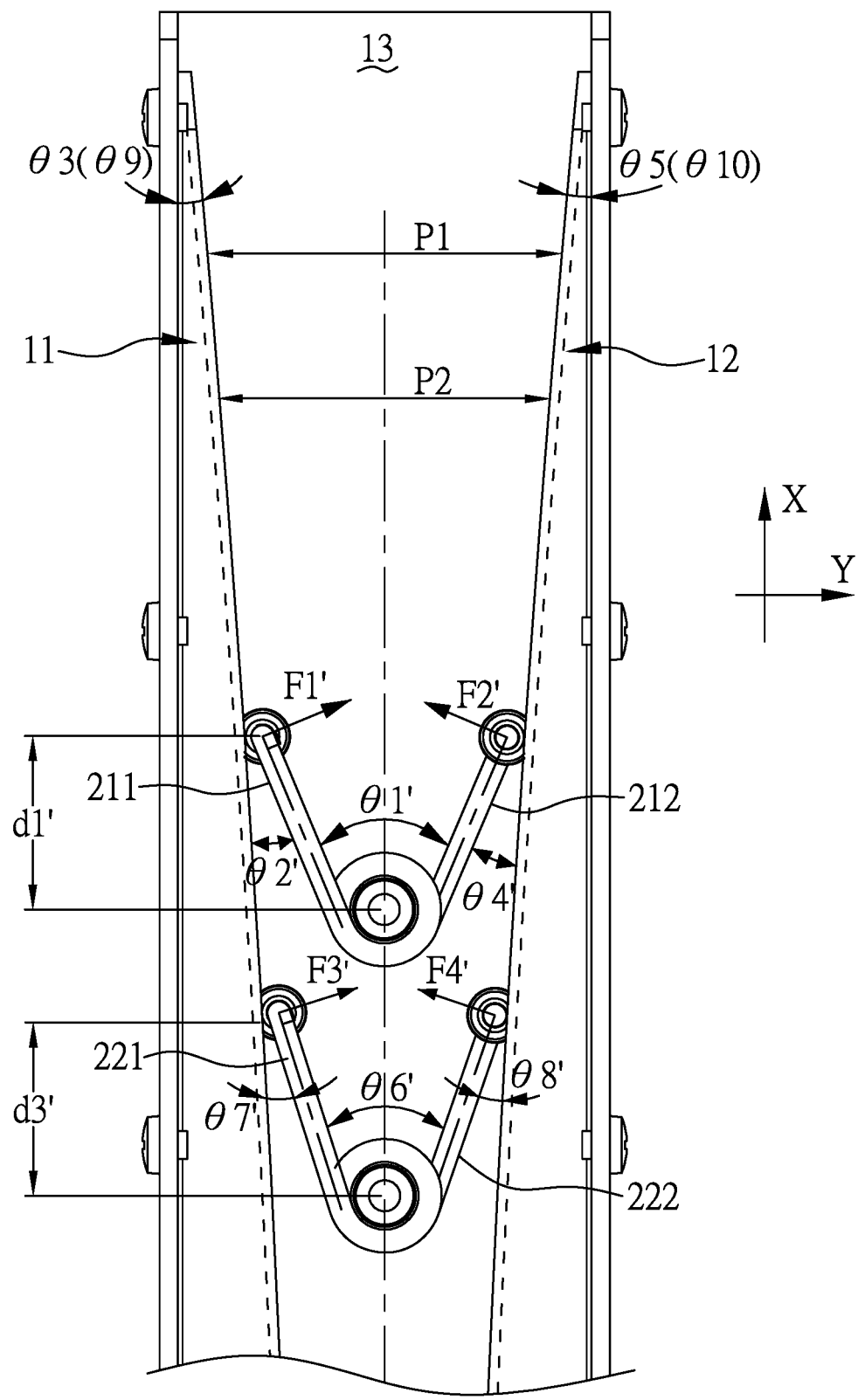
FIG. 5 is a schematic view of the lowest position of the elevatable supporting device of the first embodiment of the present invention.

One of the core technical features of the elevatable supporting device 1000 of the present invention is that the energy storage unit 2 coordinates with the first sliding structure 11 and the second sliding structure 12 and provides sustainable and stable bearing capacity along the first axis X. The following paragraph will describe the details of the energy storage unit 2. The energy storage unit 2 is movably disposed in the accommodating space 13 and abuts against the first sliding structure 11 and the second sliding structure 12 to provide a resistance in a direction opposite to the gravity. The energy storage unit 2 of the present invention has a plurality of energy storage elements. Take the present embodiment as an example, the energy storage unit 2 has a first energy storage element 21 and a second energy storage element 22. The first energy storage element 21 includes a first arm 211, a second arm 212, a first connecting section 213, a first follower 214, and a second follower 215. The first arm 211 and the second arm 212 extend from the first connecting section 213, the first follower 214 is disposed on the first arm 211, and the second follower 215 is disposed on the second arm 212. Similarly, the second energy storage element 22 includes a third arm 221, a fourth arm 222, a second connecting section 223, a third follower 224, and a fourth follower 225. The third arm 221 and the fourth arm 222 extend from the second connecting section 223, the third follower 224 is disposed on the third arm 221 and the fourth follower 225 is disposed on the fourth arm 222. The first sliding structure 11 includes a first sliding surface 111 and a third sliding surface 113, the second sliding structure 12 includes a second sliding surface 122 and a fourth sliding surface 124. A first interval P1 on a second axis Y perpendicular to the first axis X is defined between the first sliding surface 111 and the second sliding surface 122, a second interval P2 on the second axis Y is defined between the third sliding surface 113 and the fourth sliding surface 124. A width of the first interval P1 and a width of the second interval P2 continuously decrease from the highest position to the lowest position. Please refer to FIG. 4 and FIG. 5, wherein the first interval P1 and the second interval P2 illustrated in FIG. 4 are respectively at a relatively lower position on the first axis X, and the first interval P1 and the second interval P2 illustrated in FIG. 5 are respectively at a relatively higher position on the first axis X. When the energy storage unit 2 moves along with the slider 31 with respect to the upright 1, the first arm 211 slides along the first sliding surface 111, the third arm 221 slides along the third sliding surface 113, the second arm 212 slides along the second sliding surface 122, and the fourth arm 222 slides along the fourth sliding surface 124. In the present embodiment, the first sliding surface 111 and the third sliding surface 113 are overlapped and formed as a same plane, and the second sliding surface 122 and the fourth sliding surface 124 are overlapped and formed as another plane; therefore, the width of first interval P1 equals to the width of the second interval P2 at the same position on the first axis X.

As illustrated in FIG. 4, the first arm 211 provides a first resistance F1, the second arm 212 provides a second resistance F2, the third arm 221 provides a third resistance F3, and the fourth arm 222 provides a fourth resistance F4. In the present invention, the first arm 211, the second arm 212, and the first connecting section 213 integrally form a torsional spring; therefore, the first connecting section 213 has a first winding portion 2131 for the first shaft 32 to pass therethrough. The first follower 214 and the second follower 215 may be bearings which are pivotally fixed to the first arm 211 and the second arm 212 respectively. Similarly, the third arm 221, the fourth arm 222, and the second connecting section 223 integrally form a torsional spring; therefore, the second connecting section 223 has a second winding portion 2231 for the second shaft 33 to pass therethrough. The third follower 224 and the fourth follower 225 may be bearings which are pivotally fixed to the third arm 221 and the fourth arm 222 respectively. Therefore, the first follower 214, the second follower 215, the third follower 224, and the fourth follower 225 may scroll respectively on the first sliding surface 111, the second sliding surface 122, the third sliding surface 113, and the fourth sliding surface 124. However, the present invention is not limited thereto.

It should be noted that the first sliding structure 11 has a concave portion and two convex portions, also, the second sliding structure 12 has a concave portion and two convex portions (please refer to FIG. 3), wherein the concave portions are respectively located between two convex portions. The first sliding surface 111 and the third sliding surface 113 are located at the concave portion of the first sliding structure 11; the second sliding surface 122 and the fourth sliding surface 124 are located at the concave portion of the second sliding structure 12. Through the design, the locations of the first follower 214, the second follower 215, the third follower 224, and the fourth follower 225 may be restricted without departing the concave portions when the first follower 214 and the third follower 215 slide along the first sliding surface 111 and the third sliding surface 113 of the concave portion of the first sliding structure 11, and the second follower 215 and the fourth follower 225 slide along the second sliding surface 122 and the fourth sliding surface 124 of the concave portion of the second sliding structure 12. Hence, the first energy storage element 21 and the second storage element 22 will not shift and causing uneven forces when the energy storage unit 2 moves back and forth along the first axis X. In other embodiments, the first sliding surface 111 and the third sliding surface 113 may be located at the convex portion of the first sliding structure 11, and the second sliding surface 122 and the fourth sliding surface 124 may be located at the convex portion of the second sliding structure 12 with other restricting structures.

Please refer to FIG. 4 to FIG. 7 for a concise description of the operational principle of the energy storage unit 2. A first included angle $\theta 1$ is defined between the first arm 211 and the second arm 212; a second included angle $\theta 2$ is defined between the first arm 211 and the first sliding surface 111; a third included angle $\theta 3$ is defined between the first sliding surface 111 and the first axis X; a fourth included angle $\theta 4$ is defined between the second arm 212 and the second sliding surface 122; a fifth included angle $\theta 5$ is defined between the second sliding surface 122 and the first axis X; a sixth included angle $\theta 6$ is defined between the third arm 221 and the fourth arm 222; a seventh included angle $\theta 7$ is defined between the third arm 221 and the third sliding surface 113; an eighth included angle $\theta 8$ is defined between the fourth arm 222 and the fourth sliding surface 124; a ninth included angle $\theta 9$ is defined between the third sliding surface 113 and the first axis X; and a tenth included angle $\theta 10$ is defined between the fourth sliding surface 124 and the first axis X. The third included angle $\theta 3$ is constant because the first sliding surface 111 is an inclined plane with respect to the first axis X. That is, the third included angle $\theta 3$ remains the same at any location of the first sliding surface 111. Identically, the fifth included angle $\theta 5$ is also constant. Actually, in the present embodiment, the third included angle $\theta 3$ equals the ninth included angle $\theta 9$, the fifth included angle $\theta 5$ equals the tenth included angle $\theta 10$, the first siding surface 111 overlaps with the third sliding surface 113, and the second sliding surface 122 overlaps with the fourth sliding surface 124. Also, the first sliding surface 111 and the second sliding surface 122 are symmetrical with each other with respect to the first axis X, the third sliding surface 113 and the fourth sliding surface 124 are symmetrical with each other with respect to the first axis X; therefore, the third included angle $\theta 3$ equals the fifth included angle $\theta 5$, and the ninth included angle $\theta 9$ equals the tenth included angle $\theta 10$.

The first energy storage element 21 and the second energy storage element 22 are compressed, the first included angle $\theta 1$ between the first arm 211 and the second arm 212 continuously decreases (becomes the first included angle $\theta 1'$), and the sixth included angle $\theta 6$ between the third arm 221 and the fourth arm 222 continuously decreases (becomes the sixth included angle $\theta 6'$) when the energy storage unit 2 moves from the highest position to the lowest position (please refer to FIG. 4 and FIG. 5). So, the first resistance F1, the second resistance F2, the third resistance F3, and the fourth resistance F4 will continuously increase (become the first resistance F1', the second resistance F2', the third resistance F3', and the fourth resistance F4' respectively). Also, the ends of the first arm 211 and the second arm 212 connected to the first connecting section 213 will become closer to the first sliding surface 111 and the second sliding surface 122 respectively, and the ends of the third arm 221 and the fourth arm 222 connected to the second connecting section 223 will become closer to the third sliding surface 113 and the fourth sliding surface 124 respectively. Accordingly, the second included angle $\theta 2$, the fourth included angle $\theta 4$, the seventh included angle $\theta 7$, and the eighth included angle $\theta 8$ will continuously decrease (become the second included angle $\theta 2'$, the fourth included angle $\theta 4'$, the seventh included angle $\theta 7'$, and the eighth included angle $\theta 8'$ respectively). Because the first included angle $\theta 1$ changes into the first included angle $\theta 1'$, the second included angle $\theta 2$ changes into the second included angle $\theta 2'$, and the fourth included angle $\theta 4$ changes into the fourth included angle $\theta 4'$, a first effective resistance F1$x$ and F1$x'$ on the first axis X formed by the first resistance F1 and F1', and a second effective resistance F2$x$ and F2$x'$ on the first axis X formed by the second resistance F2 and F2' are essentially stabilized (that is, F1$x$ equals F1$x'$, and F2$x$ equals F2$x'$). Similarly, because the sixth included angle $\theta 6$ changes into the sixth included angle $\theta 6'$, the seventh included angle $\theta 7$ changes into the seventh included angle $\theta 7'$, and the eight included angle $\theta 8$ changes into the eight included angle $\theta 8'$, a third effective resistance F3$x$ and F3$x'$ on the first axis X formed by the third resistance F3 and F3', and a fourth effective resistance F4$x$ and F4$x'$ on the first axis X formed by the fourth resistance F4 and F4' are essentially stabilized (that is, F3$x$ equals F3$x'$, and F4$x$ equals F4$x'$).

On the contrary, when the energy storage unit 2 moves from the lowest position to the highest position (please refer to FIG. 5), the first included angle $\theta 1'$ between the first arm 211 and the second arm 212 of the first energy storage element 21 continuously increases and becomes the first included angle $\theta 1$, and the sixth included angle $\theta 6'$ between the third arm 221 and the fourth arm 222 of the second energy storage element 22 continuously increases and becomes the sixth included angle $\theta 6$. Accordingly, the first resistance F1', the second resistance F2', the third resistance F3', and the fourth resistance F4' will continuously decrease (become the first resistance F1, the second resistance F2, the third resistance F3, and the fourth resistance F4 respectively). Also, the second included angle $\theta 2'$, the fourth included angle θ4', the seventh included angle θ7', and the eighth included angle θ8' continuously increase (become the second included angle θ2, the fourth included angle θ4, the seventh included angle θ7, and the eighth included angle θ8 respectively).

Because the first included angle θ1' changes into the first included angle θ1, the second included angle θ2' changes into the second included angle θ2, and the fourth included angle θ4' changes into the fourth included angle θ4, the first effective resistance F1x and F1x' on the first axis X formed by the first resistance F1 and F1', and the second effective resistance F2x and F2x' on the first axis X formed by the second resistance F2 and F2' are still essentially stabilized. Similarly, because the sixth included angle θ6' changes into the sixth included angle θ6, the seventh included angle θ7' changes into the seventh included angle θ7, and the eight included angle θ8' changes into the eight included angle θ8, the third effective resistance F3x and F3x' on the first axis X formed by the third resistance F3 and F3', and the fourth effective resistance F4x and F4x' on the first axis X formed by the fourth resistance F4 and F4' are still essentially stabilized Accordingly, in the case of applying an external force, the energy storage unit 2, the bearing module 3, and the display 2000 are actuated together so that the display 2000 may be adjusted to an appropriate position by the user. When the external force is removed, the energy storage unit 2, the bearing module 3, and the display 2000 remain in a static equilibrium status so that the display 2000 may stop at any position between the highest position and the lowest position.

The variations of the effective resistance on the first axis X formed from the first resistance F1, the second resistance F2, the third resistance F3, and the fourth resistance F4 when the energy storage unit 2 moves from different positions will be described in detail in the following paragraph.

Figure 6:
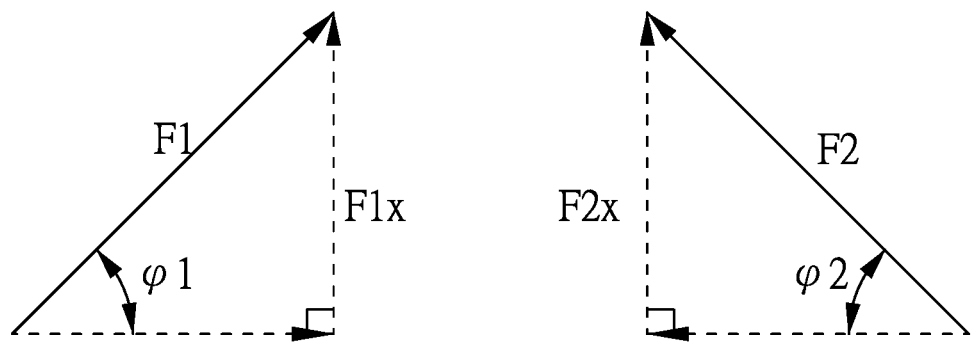
FIG. 6 is a schematic view of dividing forces of each resistance at the highest position of the elevatable supporting device of the first embodiment of the present invention.
Figure 7:
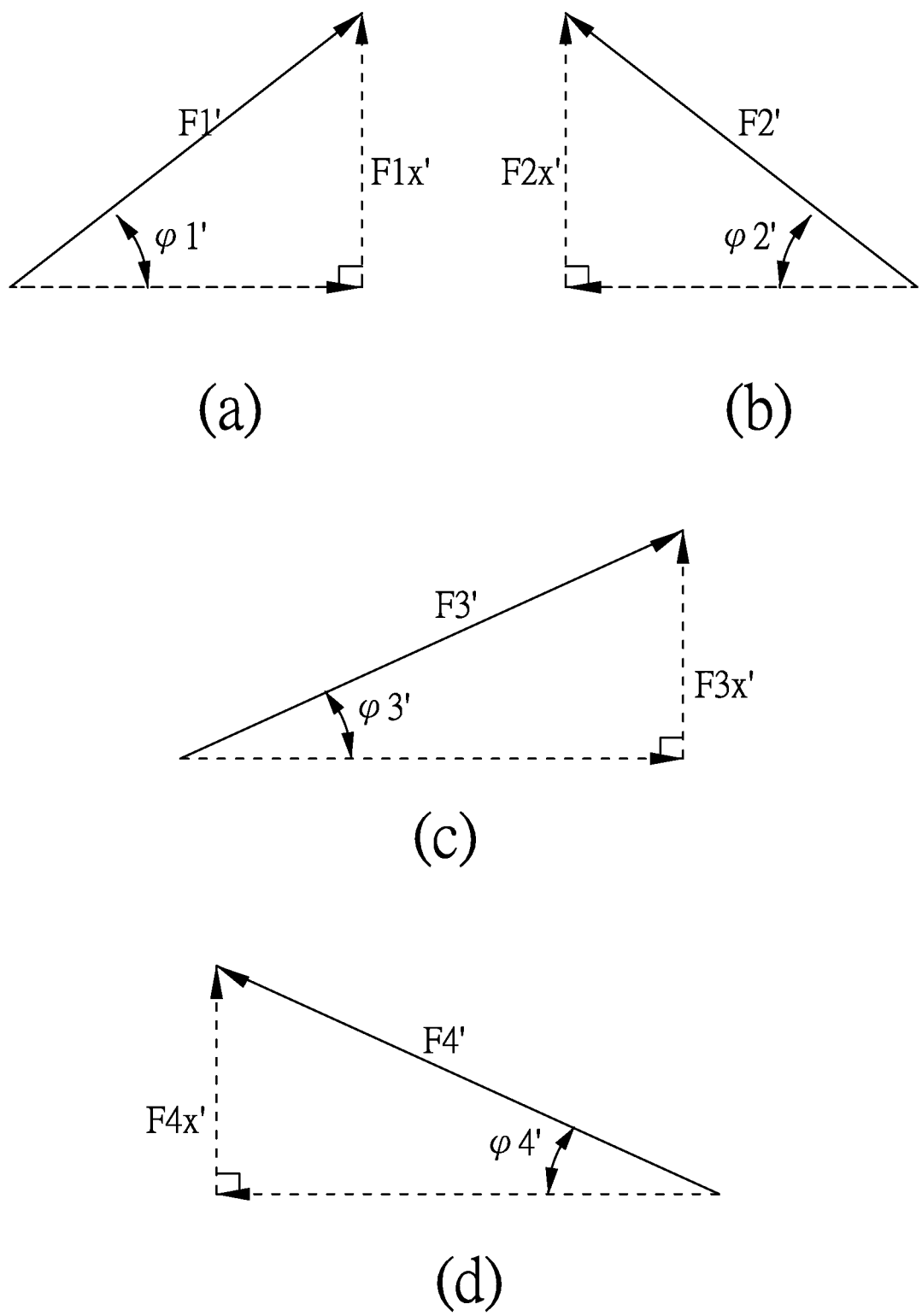
FIG. 7 is a schematic view of dividing forces of each resistance at the lowest position of the elevatable supporting device of the first embodiment of the present invention.

In the first energy storage element 21 illustrated in FIG. 4 and FIG. 6, the first resistance F1 constantly faces the direction perpendicular to the first arm 211. The first included angle θ1 continuously decreases, the elastic storage energy of the first energy storage element 21 gradually increases, the first resistance F1 increases, and the direction of the first resistance F1 continuously changes as the energy storage unit 2 moves from the highest position to the lowest position. In order to obtain the first effective resistance F1x, a first inclined angle φ1 between the first resistance F1 and the second axis Y should first be defined. It should be known by calculation that the first inclined angle φ1 is the sum of the second included angle θ2 and the third included angle θ3 essentially. Because the third included angle θ3 is constant, the first inclined angle φ1 increases as the second included angle θ2 increases, and the first inclined angle φ1 decreases as the second included angle θ2 decreases between the highest position and the lowest position. Similarly, the second resistance F2 constantly faces the direction perpendicular to the second arm 212. The first included angle θ1 continuously decreases, the elastic storage energy of the first energy storage element 21 gradually increases, the second resistance F2 increases, and the direction of the second resistance F2 continuously changes as the energy storage unit 2 moves from the highest position to the lowest position. In order to obtain the second effective resistance F2x, a second inclined angle φ2 between the second resistance F2 and the second axis Y should first be defined. It should be known by calculation that the second inclined angle φ2 is the sum of the fourth included angle θ4 and the fifth included angle θ5 essentially. Because the fifth included angle θ5 is constant, the second inclined angle φ2 increases as the fourth included angle θ4 increases, and the second inclined angle φ2 decreases as the fourth included angle θ4 decreases.

The operation principle of the second energy storage element 22 is similar to that of the first energy storage element 21, wherein the third resistance F3 constantly faces the direction perpendicular to the third arm 221. The sixth included angle θ6 continuously decreases, the elastic storage energy of the second energy storage element 22 gradually increases, the third resistance F3 increases, and the direction of the third resistance F3 continuously changes as the energy storage unit 2 moves from the highest position to the lowest position. In order to obtain the third effective resistance F3x, a third inclined angle φ3 between the third resistance F3 and the second axis Y should first be defined. It should be known by calculation that the third inclined angle φ3 is the sum of the ninth included angle θ9 and the seventh included angle θ7 essentially. Because the ninth included angle θ9 is constant, the third inclined angle φ3 increases as the seventh included angle θ7 increases, and the third inclined angle φ3 decreases as the seventh included angle θ7 decreases between the highest position and the lowest position. Similarly, the fourth resistance F4 constantly faces the direction perpendicular to the fourth arm 222. The sixth included angle θ6 continuously decreases, the elastic storage energy of the second energy storage element 22 gradually increases, the fourth resistance F4 increases, and the direction of the fourth resistance F4 continuously changes as the energy storage unit 2 moves from the highest position to the lowest position. In order to obtain the fourth effective resistance F4x, a fourth inclined angle φ4 between the fourth resistance F4 and the second axis Y should first be defined. It should be known by calculation that the fourth inclined angle φ4 is the sum of the tenth included angle θ10 and the eighth included angle θ8 essentially. Because the tenth included angle θ10 is constant, the fourth inclined angle φ4 increases as the eighth included angle θ8 increases, and the fourth inclined angle φ4 decreases as the eight included angle θ8 decreases.

The main source of the supporting force against the weight of the display 2000 and the bearing module 3 is the sum of the dividing forces along the first axis X of first resistance F1, the second resistance F2, the third resistance F3, and the fourth resistance F4 provided by the energy storage unit 2, that is, the sum of the first effective resistance F1x (F1·sin φ1), the second effective resistance F2x (F2·sin φ2), the third effective resistance F3x (F3·sin φ3), and the fourth effective resistance F4x (F4·sin φ4).

The sum is defined as a total effective resistance Fx. When the energy storage unit 2 moves from the highest position illustrated in FIG. 4 to the lowest position illustrated in FIG. 5, the first included angle θ1 becomes the smaller first includes angle θ1', the second included angle θ2 becomes the smaller second included angle θ2', the fourth included angle θ4 becomes the smaller fourth included angle θ4', the sixth included angle θ6 becomes the smaller sixth included angle θ6', the seventh included angle θ7 becomes the smaller seventh included angle θ7', the eight included angle θ8 becomes the smaller eighth included angle θ8', the first inclined angle φ1 becomes a smaller first inclined angle φ1', the second inclined angle φ2 becomes a smaller second inclined angle φ2', the third inclined angle φ3 becomes a smaller third inclined angle φ3', the fourth inclined angle φ4 becomes a smaller fourth inclined angle φ4', and the first resistance F1 becomes the larger first resistance F1', the second resistance F2 becomes the larger second resistance F2', the third resistance F3 becomes the larger third resistance F3', and the fourth resistance F4 becomes the larger fourth resistance F4'. Because the value of the first inclined angle φ1 decreases to φ1', the value of the sin φ1 decreases to sin φ1' when the energy storage unit 2 moves from the highest position to the lowest position, which shows that the dividing force of the first resistance F1 on the first axis X gradually decreases. However, the value of the first resistance F1 increases to F1' when the energy storage unit 2 moves from the highest position to the lowest position so that the first effective resistance F1$x$ (F1·sin φ1) at the highest position substantially equals the first effective resistance F1$x$' (F1'·sin φ1') at the lowest position. Similarly, the second effective resistance F2$x$ (F2·sin φ2) at the highest position substantially equals the second effective resistance F2$x$' (F2'·sin φ2') at the lowest position, the third effective resistance F3$x$ (F3·sin φ3) at the highest position substantially equals the second effective resistance F3$x$' (F3'·sin φ3') at the lowest position, and the fourth effective resistance F4$x$ (F4·sin φ4) at the highest position substantially equals the fourth effective resistance F4$x$' (F4'·sin φ4') at the lowest position. Hence, it can be inferred that the total effective resistance F$x$ at the highest position and a total effective resistance F$x$' at the lowest position is essentially the same. According to the above descriptions, although the first resistance F1, the second resistance F2, the third resistance F3, and the fourth resistance F4 are different from the first resistance F1' the second resistance F2', the third resistance F3', and the fourth resistance F4' (the first resistance F1' is larger than the first resistance F1, the second resistance F2' is larger than the second resistance F2, the third resistance F3' is larger than the third resistance F3, and the fourth resistance F4' is larger than the fourth resistance F4) at the highest position and the lowest position, the energy storage unit 2 may essentially provide a constant force along the first axis X. In addition, the display 2000 and the bearing module 3 may stop at any position between the highest position and the lowest position by considering the possible frictions between the components.

Furthermore, the first arm 211 and the second arm 212 of the first energy storage element 21 may generate other kinds of forces against the first sliding surface 111 and the second sliding surface 122. Also, the third arm 221 and the fourth arm 222 of the second energy storage element 22 may generate other kinds of forces against the third sliding surface 113 and the fourth sliding surface 124. These effects are also related to the change of the first included angle θ1, the second included angle θ2, the fourth included angle θ4, the sixth included angle θ6, the seventh included angle θ7, and the eighth included angle θ8. In other words, the first effective resistance F1$x$, the second effective resistance F2$x$, the third effective resistance F3$x$, and the fourth effective resistance F4$x$ probably include the dividing force of the static friction or kinetic friction. However, the main effects were discussed in the aforementioned paragraphs, and other effects are not specified herein.

It should be noted that the original value of the first included angle θ1 is larger than an included angle between the first sliding surface 111 and the second sliding surface 122, and the original value of the sixth included angle θ6 is larger than an included angle between the third sliding surface 113 and the fourth sliding surface 124.

Therefore, it should be understood that the third included angle θ3 between the first sliding surface 111 and the first axis X and the fifth included angle θ5 between the second sliding surface 122 and the first axis X are constantly smaller than the first included angle θ1. Specifically, in the present embodiment, the first sliding surface 111 and the second sliding surface 122 are symmetrical with respect to the first axis X, and the third included angle θ3, and the fifth included angle θ5 are the same, also, the ninth included angle θ9 equals the tenth included angle θ10 with respect to the first axis X. In order to ensure that the first arm 211 and the second arm 212 of the first energy storage element 21 and the third arm 221 and the fourth arm 222 of the second energy storage element 22 may effectively abut against the first sliding surface 11, the second sliding surface 12, the third sliding surface 113, and the fourth sliding surface 124 respectively, the first included angle θ1 and the sixth included angle θ6 should be larger than the included angle between the sliding surfaces. That is, θ1>θ3+θ5 and θ6>θ9+θ10 must be fulfilled; thus, the first energy storage element 21 and the second energy storage element 22 may continuously provide resistances against the first sliding structure 11 and the second sliding structure 12.

Also, because the included angles of the first energy storage element 21 and the second energy storage element 22, and the included angles between the sliding surfaces and their arms change in the process of moving the energy storage unit 2 from the highest position to the lowest position, the projected length of the first arm 211, the second arm 212, the third arm 221, and the fourth arm 222 projected on the first axis X continuously increase. Please refer to FIG. 4 and FIG. 5, the included angle between the first arm 211 and the first axis X equals the sum of the second included angle θ2 and the third included angle θ3. The sum thereof continuously decrease because the third included angle θ3 remains constant and the second included angle θ2 continuously decreases. The projected length d1 of the first arm 211 projected on the first axis X is the length of the first arm 211 multiply cos(θ2+θ3), wherein (θ2+θ3) is between 0 and 90 degrees. (θ2+θ3) gradually decreases and the projected length d1 gradually increases to the projected length d1' when the first energy storage element 21 moves from the highest position to the lowest position. The projected length d3 of the third arm 221 projected on the first axis X is the length of the third arm 221 multiply cos(θ9+θ7), wherein (θ9+θ7) is between 0 and 90 degrees. (θ9+θ7) gradually decreases and the projected length d3 gradually increases to the projected length d3' when the second energy storage element 22 moves from the highest position to the lowest position. Similarly, the projected length of the second arm 212 projected on the first axis X is the length of the second arm 212 multiply cos(θ4+θ5). (θ4+θ5) gradually decreases and the projected length gradually increases when the second energy storage element 22 moves from the highest position to the lowest position. The projected length of the fourth arm 222 projected on the first axis X is the length of the fourth arm 222 multiply cos(θ10+θ8). (θ10+θ8) gradually decreases and the projected length gradually increases when the second energy storage element 22 moves from the highest position to the lowest position.

Figure 8:
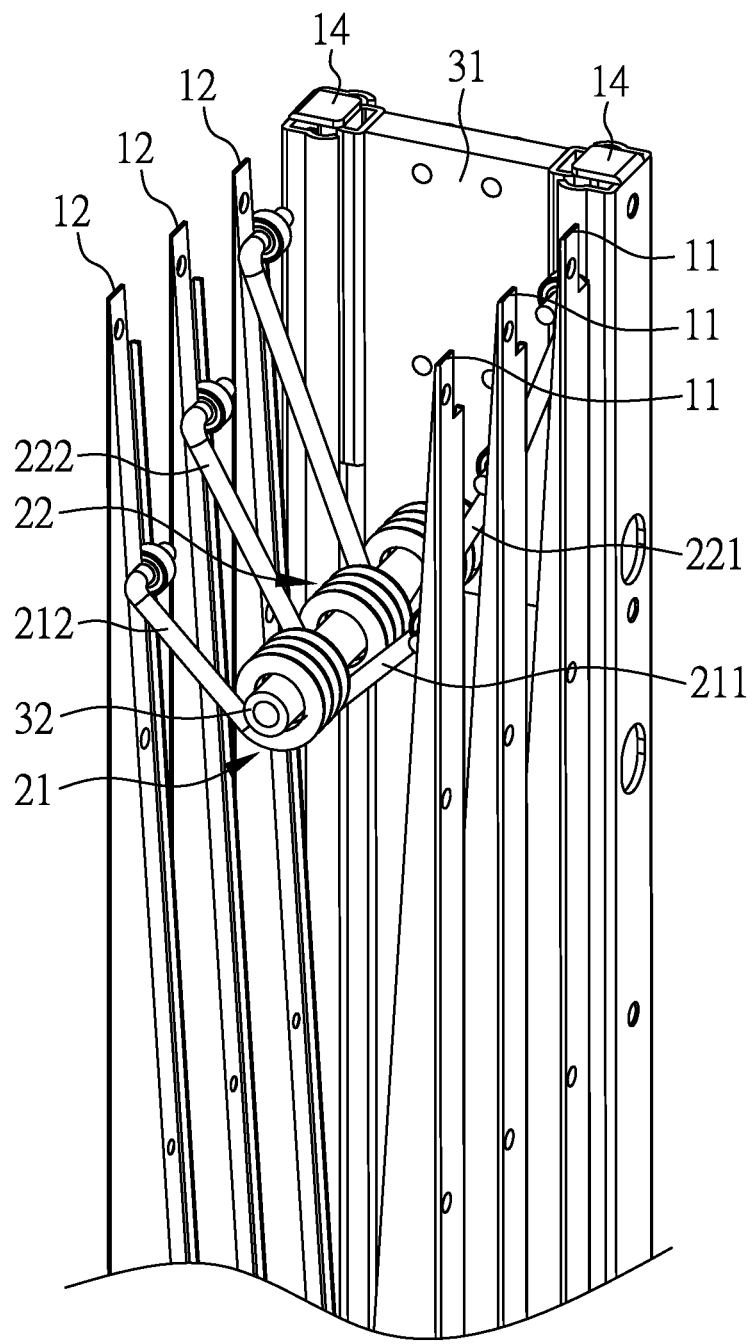
FIG. 8 is a rear partial perspective view of the elevatable supporting device of the second embodiment of the present invention.
Figure 9:
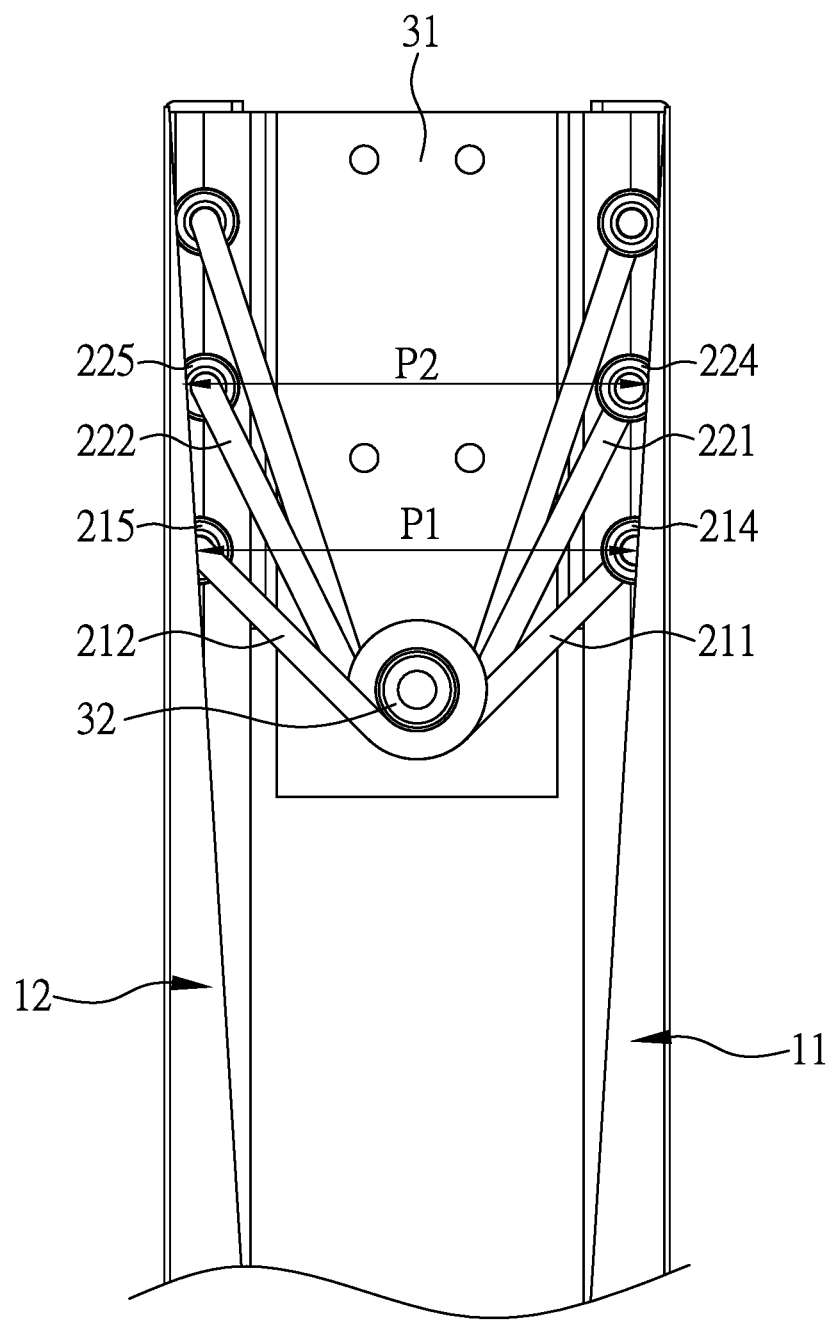
FIG. 9 is a rear partial view of the elevatable supporting device of the second embodiment of the present invention.
Figure 10:
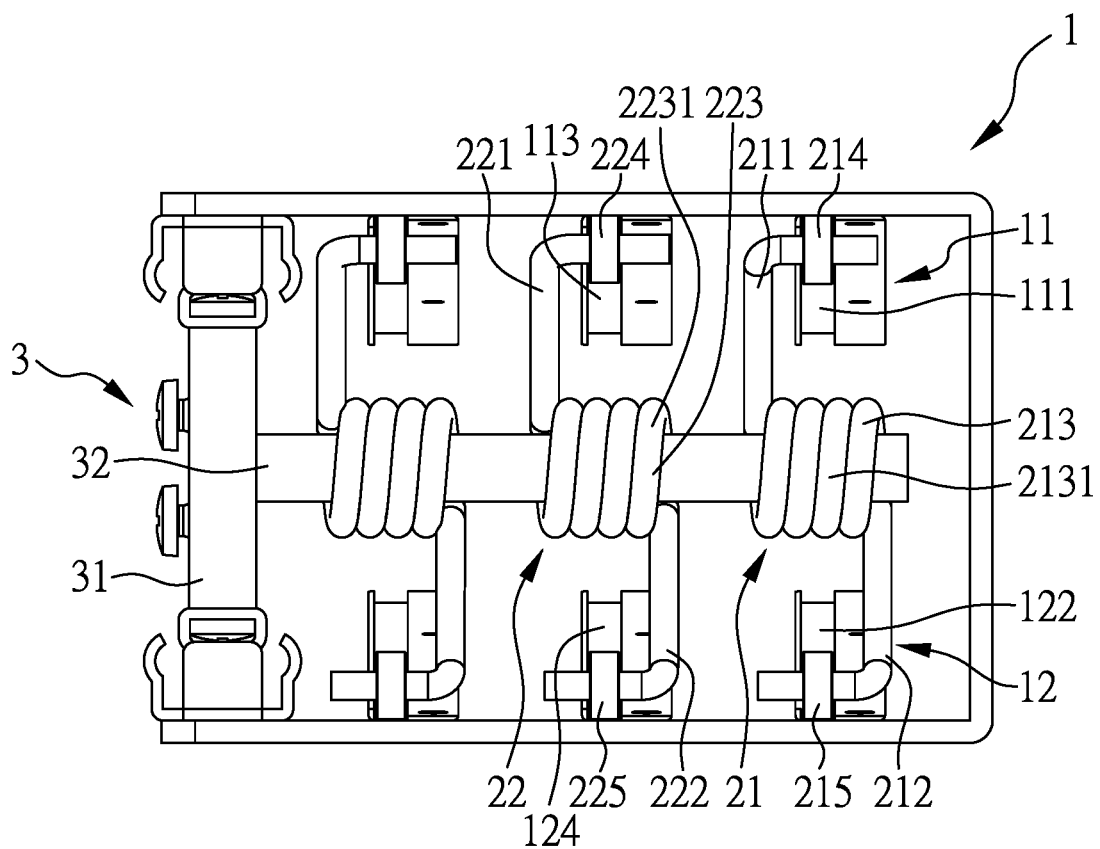
FIG. 10 is a top view of the elevatable supporting device of the second embodiment of the present invention.

Please refer to FIG. 8, FIG. 9, and FIG. 10 illustrating the partial perspective view of two different viewing angles and the top view of the elevatable supporting device 1000 of the second embodiment of the present invention.

In the present embodiment, the energy storage unit 2 includes three energy storage elements; however, in other embodiments, the number of the energy storage element may be two, three, or more than three. The present embodiment exemplifies three energy storage elements in an energy storage unit. However, the following description will focus on two of the energy storage elements, the structure and the operation principle of the third energy storage element are similar to the first and the second energy storage elements; therefore, the detailed descriptions of the third energy storage element are omitted. In addition, the first sliding structure 11 includes three sliding surfaces, and the second sliding structure 12 includes three sliding surfaces. The first sliding surface 111, the second sliding surface 122, the third sliding surface 113, and the fourth sliding surface 124 are illustrated in FIG. 10 for further descriptions. The second shaft 33 of the bearing module 3 mentioned in the first embodiment is omitted. As shown in FIG. 10, three of the energy storage elements are torsional springs, and the operational principles thereof are similar to that of the torsional springs in the first embodiment. The difference between the present embodiment and the first embodiment is that the winding portions of the connecting sections of the energy storage elements are sleeved on the same shaft, for example, the first winding portion 2131 and the second winding portion 2231 are sleeved on the first shaft 32. Accordingly, the energy storage elements included in the energy storage unit 2 are not arranged up and down, but are arranged back and forth. The included angle between two arms and the length of the arms in each of the energy storage elements are different (the first included angle θ1 is larger than the sixth included angle θ6, and the first arm 211 and the second arm 212 are shorter than the third arm 221 and the fourth arm 222).

The energy storage elements are arranged back and forth, the followers move along the first sliding surface 111, the second sliding surface 122, the third sliding surface 113, the fourth sliding surface 124, which are respectively configured by a concave portion and two convex portions disposed at two sides of the concave portion for restricting the movements of those followers. It is understood that in the present embodiment, the first sliding surface 111 and the third sliding surface 113 are essentially coplanar (that is, the third included angle θ3 equals the ninth included angle θ9). Alternatively, the first sliding surface 111 and the third sliding surface 113 may be non-coplanar based on the structural designs (that is, the slopes of the first sliding surface 111 and the third sliding surface 113 are different, the third included angle θ3 does not equal to the ninth included angle θ9). Similarly, the second sliding surface 122 and the fourth sliding surface 124 may be coplanar (the fifth included angle θ5 equals the tenth included angle θ10) or non-coplanar (the fifth included angle θ5 does not equal the tenth included angle θ10).

It should be noted that if the first sliding surface 111 and the third sliding surface 113 have the same slope and the second sliding surface 122 and the fourth sliding surface 124 have the same slope, the first interval P1 and the second interval P2 are still the same at a position of same height on the first axis X. In other embodiments, for example, if the slopes of the first sliding surface 111 and the third sliding surface 113 are different and the slopes of the second sliding surface 122 and the fourth sliding surface 124 are different, the first interval P1 and the second interval P2 are not necessary the same at a position of same height on the first axis X. Hence, the specification and the arm length of the energy storage element may be selected and the slopes of the sliding surfaces may be designed to provide bearing capacity for different sizes of the display, it is not limited herein.

Figure 11:
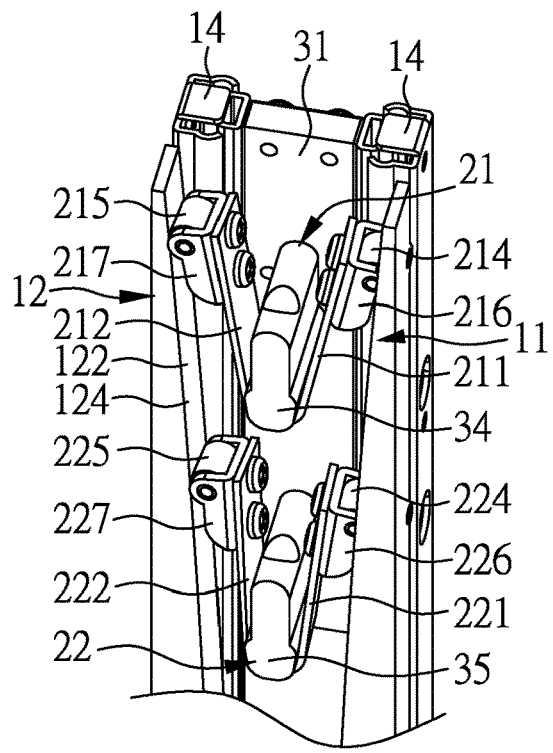
FIG. 11 is a rear partial perspective view of the elevatable supporting device of the third embodiment of the present invention.
Figure 12:
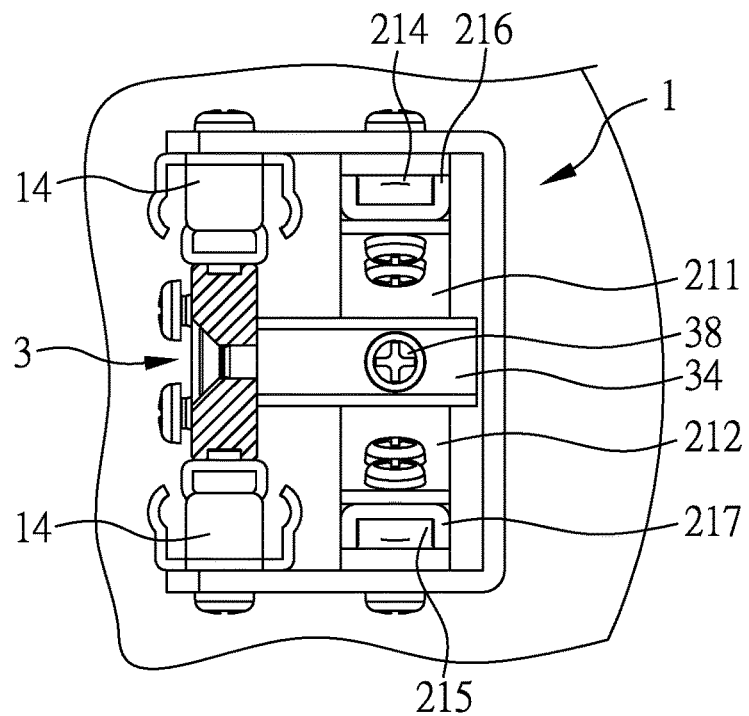
FIG. 12 is a top view of the elevatable supporting device of the third embodiment of the present invention.

Please refer to FIG. 11 and FIG. 12 illustrating the rear partial perspective view and the top view of the elevatable supporting device 1000 of the third embodiment of the present invention.

Figure 13:
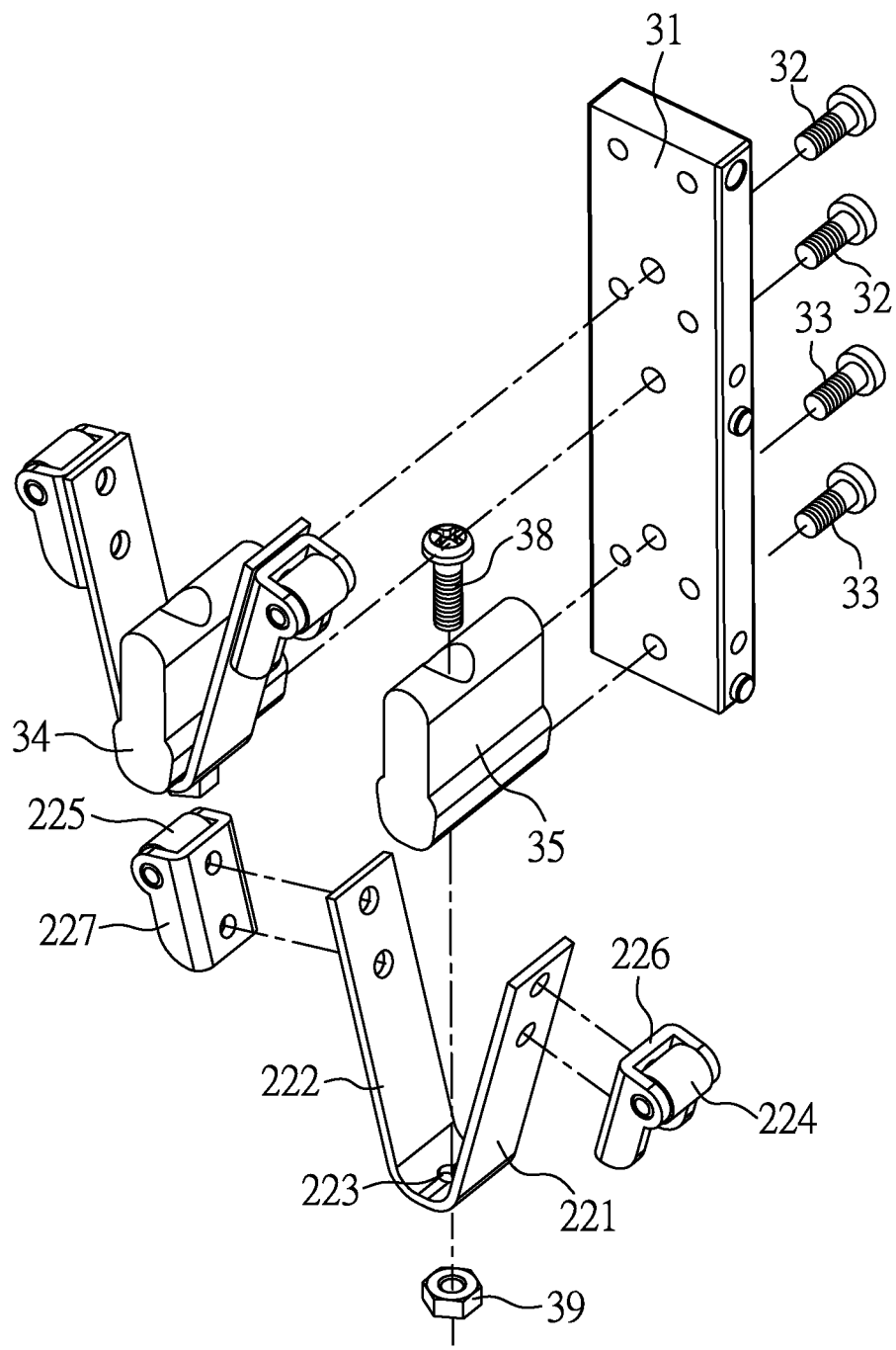
FIG. 13 is a partial explosive perspective view of the elevatable supporting device of the third embodiment of the present invention.

The operation principle of the present embodiment is similar to that of the first embodiment, one difference between them is that the concave portion and the convex portion in the first embodiment are omitted, and another difference between them is that the energy storage unit 2 includes two V-shaped elastic steel plates. For example, each of the V-shaped elastic steel plates may be made of a flat spring, wherein each of the connecting sections having a pre-opening angle is formed by bending the elastic plate. Different from the torsional spring utilized in the first embodiment, the connecting sections of the energy storage elements in the present embodiment do not include winding portions, so that the energy storage unit 2 and the bearing module 3 are not actuated together through the winding portions set on the first shaft. As illustrated in FIG. 13, the bearing module 3 of the present embodiment has two first shafts 32, two second shafts 33, a first block 34, a second block 35, two screws 38, and two nuts 39. The first block 34 connects to the first shafts 32 and the connecting section 213 of the first energy storage element 21, and the second block 35 connects to the second shafts 33 and the connecting section 223 of the second energy storage element 22. Specifically, one of the screws 38 passes through the first block 34 and the first connecting section 213 simultaneously and is bolted with one of the nuts 39 to fasten the first block 34 and the first connecting section 213. The first shafts 32 pass through and are fixed to the first block 33. Similarly, the second block 35 is fixed to the second connecting section 223 through another screw 38 and nut 39, the second shafts 33 pass through and are fixed to the second block 35. Therefore, the energy storage unit 2 and the bearing module 3 can be actuated simultaneously.

In addition to the present embodiment, the first arm 211, the second arm 212, and the first connecting section 213 are integrally formed by bending the elastic steel plate, such as the flat spring. Also, the third arm 221, the fourth arm 222, and the second connecting section 223 are integrally formed by bending the elastic steel plate. Therefore, the first arm 211, the second arm 212, the third arm 221, and the fourth arm 222 are plate-shaped. Accordingly, in order to assemble the first follower 214, the second follower 215, the third follower 224, and the fourth follower 225, the first energy storage element 21 further comprises a first pivotal unit 216 fixed on the first arm 211 and a second pivotal unit 217 fixed on the second arm 212. The first follower 214 is pivotally fixed on the first pivotal unit 216 and the second follower 215 is pivotally fixed on the second pivotal unit 217. The second energy storage element 22 further comprises a third pivotal unit 226 fixed on the third arm 221 and a fourth pivotal unit 227 fixed on the fourth arm 222, wherein the third follower 224 is pivotally fixed on the third pivotal unit 226 and the fourth follower 225 is pivotally fixed on the fourth pivotal unit 227.

Figure 14:
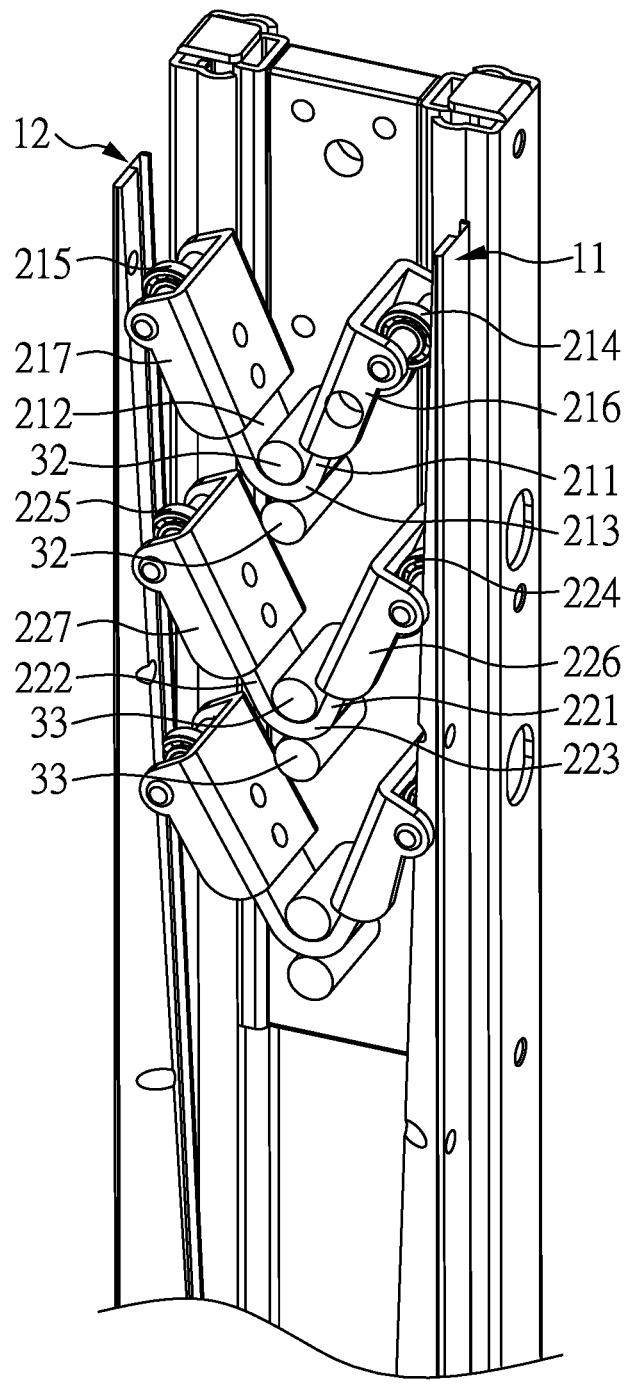
FIG. 14 is a rear partial perspective view of the elevatable supporting device of the fourth embodiment of the present invention.
Figure 15:
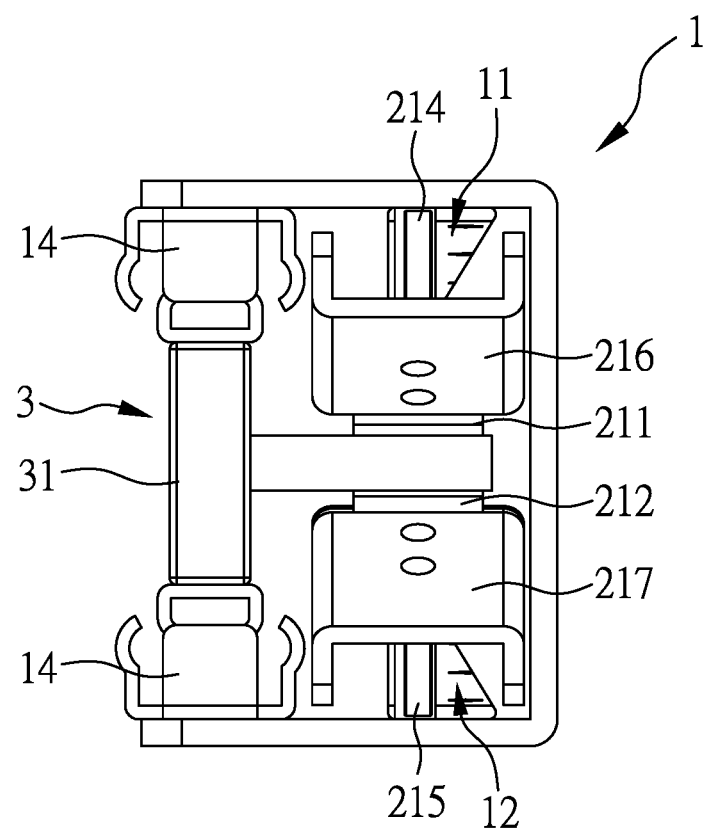
FIG. 15 is a top view of the elevatable supporting device of the fourth embodiment of the present invention.

Please refer to FIG. 14 and FIG. 15, which illustrate the rear partial perspective view and the top view of the elevatable supporting device 1000 of the fourth embodiment of the present invention.

The structural features are similar to that of the third embodiment, wherein the energy storage unit 2 comprises a V-shaped elastic steel plate with a pre-opening angle. The first follower 214 and the second follower 215 are actuated together with the first arm 211 and the second arm 212 through the first pivotal unit 216 and the second pivotal unit 217 to which the first follower 214 and the second follower 215 are pivotally fixed. Also, the third follower 224 and the fourth follower 225 are actuated together with the third arm 221 and the fourth arm 222 through the third pivotal unit 226 and the fourth pivotal unit 227 to which the third follower 224 and the fourth follower 225 are pivotally fixed. One of the differences between the present embodiment and the third embodiment is that a third energy storage element is illustrated for showing that the number of the energy storage element is not limited. Another difference between the present embodiment and the third embodiment is that the first block 34 and the second block 35 in the third embodiment are omitted. The bearing module 3 is actuated together with the energy storage unit 2 by directly clamping two sides of each connecting section with two shafts (that is, two sides of the first connecting section 213 is clamped by two first shafts 32, and two sides of the second connecting section 223 is clamped by two second shafts 33).

Figure 16:
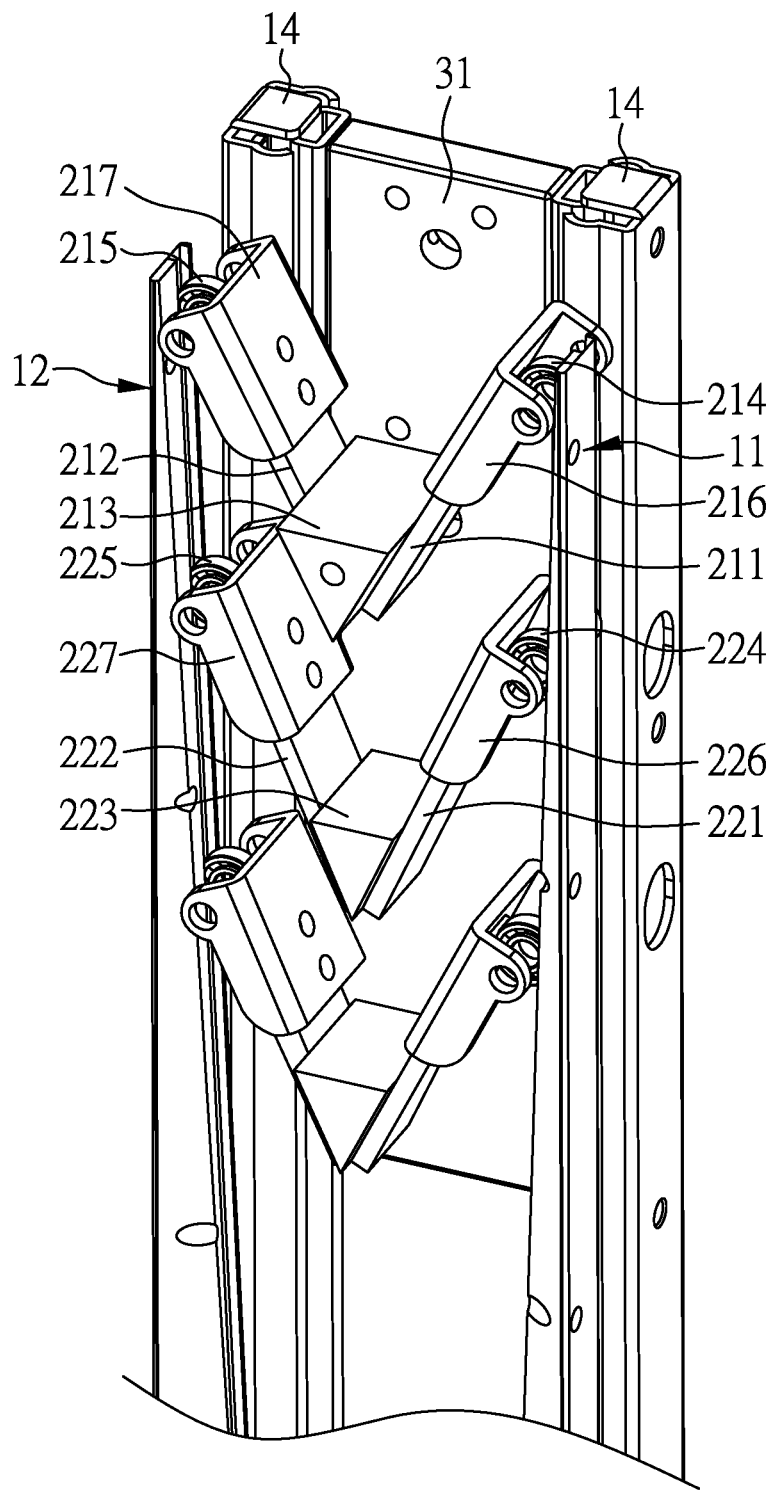
FIG. 16 is rear partial perspective view of the elevatable supporting device of the fifth embodiment of the present invention.
Figure 17:
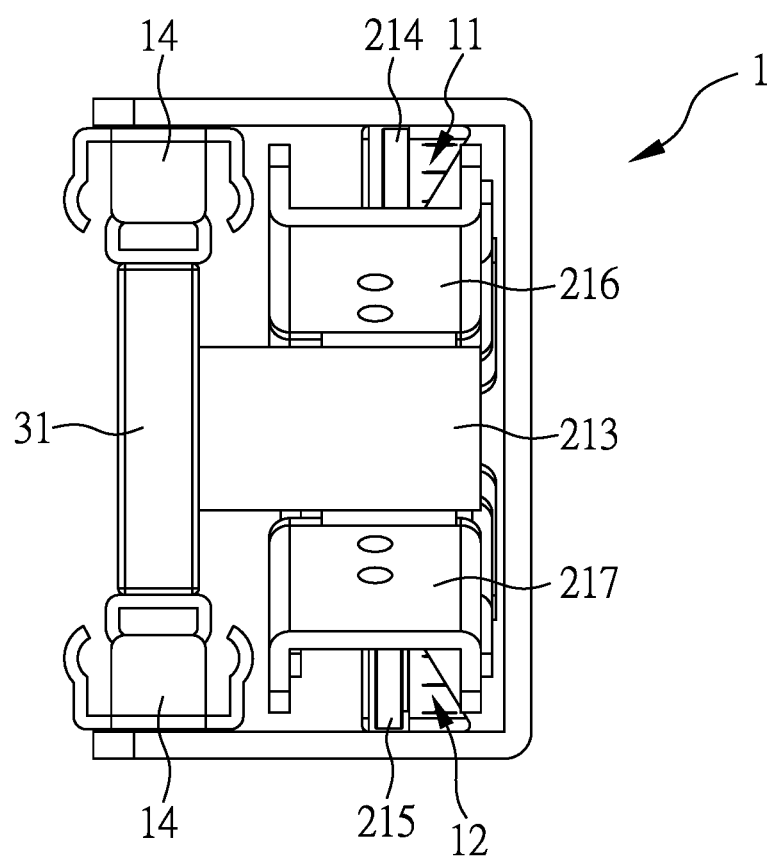
FIG. 17 is a top view of the elevatable supporting device of the fifth embodiment of the present invention.

Refer to FIG. 16 and FIG. 17, which illustrate the rear partial perspective view and the top view of the elevatable supporting device 1000 the fifth embodiment.

The operational principle of the present embodiment is similar to that of the abovementioned embodiments, and the structural features are similar to that of the third embodiment. The difference between the present embodiment and the abovementioned embodiment is that each of the connecting sections of the energy storage unit 2 is fixed by two flat springs. Take the first energy storage element 21 as an example, the flat springs are the first arm 211 and the second arm 212 respectively, and the connecting section 213 is a support block connecting to the slider 31. The flat springs may be fixed to the connecting section 23 through welding or screw locking. Similar to the aforementioned embodiments, the first follower 214 and the second follower 215 are pivotally fixed to the first pivotal unit 216 and the second pivotal unit 217 respectively and are actuated together with the first arm 211 and the second arm 212, the third follower 224 and the fourth follower 225 are pivotally fixed to the third pivotal unit 226 and the fourth pivotal unit 227 respectively and are actuated together with the third arm 221 and the fourth arm 222. In the present embodiment, the source of the total effective resistance Fx is the flat springs. The elevatable supporting device 1000 utilizes parts of the first arm 211 and the second arm 212 other than the parts connecting to the connecting section 213 (support block) as the deformable segments of the flat springs for providing support against the weight of the energy storage unit 2, the bearing module 3, and the display 2000.

In addition to the present embodiment, the bearing module 3 does not include the first shaft 32, the second shaft 33, the first block 34, and the second block 35; therefore, the first energy storage element 21 and the second energy storage element 22 are directly connected to and actuated together with the bearing module 3 through the first connecting section 213 (support block) and the second connecting section 223. The first connecting section 213 is connected to the first arm 211 and the second arm 212 and is fixed to the slider 31, the second connecting section 223 is connected to the third arm 221 and the fourth arm 222 and is fixed to the slider 31 so that the energy storage unit 2 and the bearing module 3 can be actuated together. Also, in the present embodiment, the first follower 214, the second follower 215, the third follower 224, and the fourth follower 225 are bearings respectively.

Figure 18:
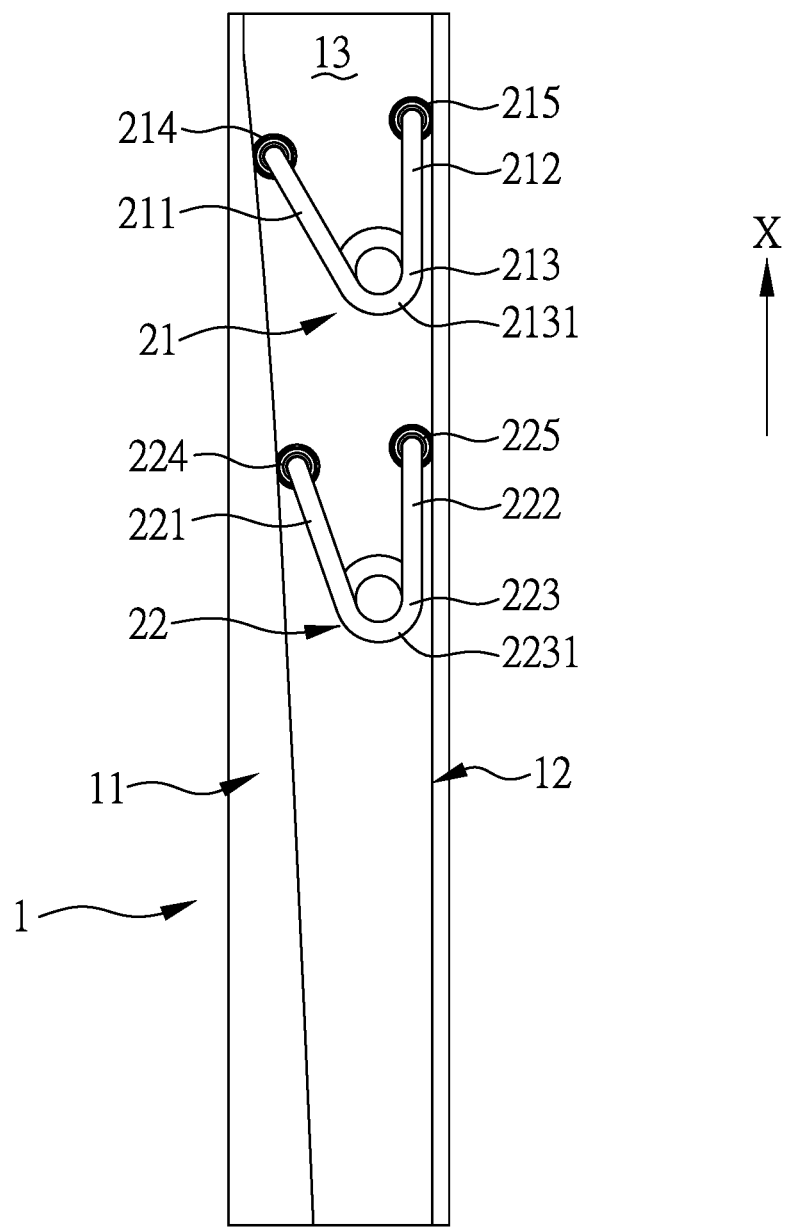
FIG. 18 is a partial view of the elevatable supporting device of the sixth embodiment of the present invention.

Please refer to FIG. 18, illustrating the partial view of the elevatable supporting device 1000 of the sixth embodiment of the present invention.

The structural features are similar to that of the first embodiment. The difference between them is that the first sliding structure 11 and the second sliding structure 12 of the present embodiment are non-symmetrical with respect to the first axis X, and the concave and convex portions are omitted. For instance, the first sliding surface 111 and the third sliding surface 113 are non-parallel to the first axis X but the second sliding surface 122 and the fourth sliding surface 124 are parallel to the first axis X. When the energy storage unit 2 slides between the highest position and the lowest position, the second arm 212 and the fourth arm 222 slide closely to the second sliding surface 122 and the fourth sliding surface 124 and simultaneously move with the bearing module 3 and the display 2000 along the first axis X.

In the present embodiment, only the first sliding structure 11 inclined with respect to the first axis X, therefore, the first included angle θ1 should only be maintained larger than the third included angle θ3 and the sixth included angle θ6 should only be maintained larger than the ninth included angle θ9 in the condition of θ1>θ3+θ5 and θ6>θ9+θ10. Thus, the first energy storage element 21 and the second energy storage element 22 are able to effectively abut against the first sliding structure 11 and the second sliding structure 12.

Figure 19:
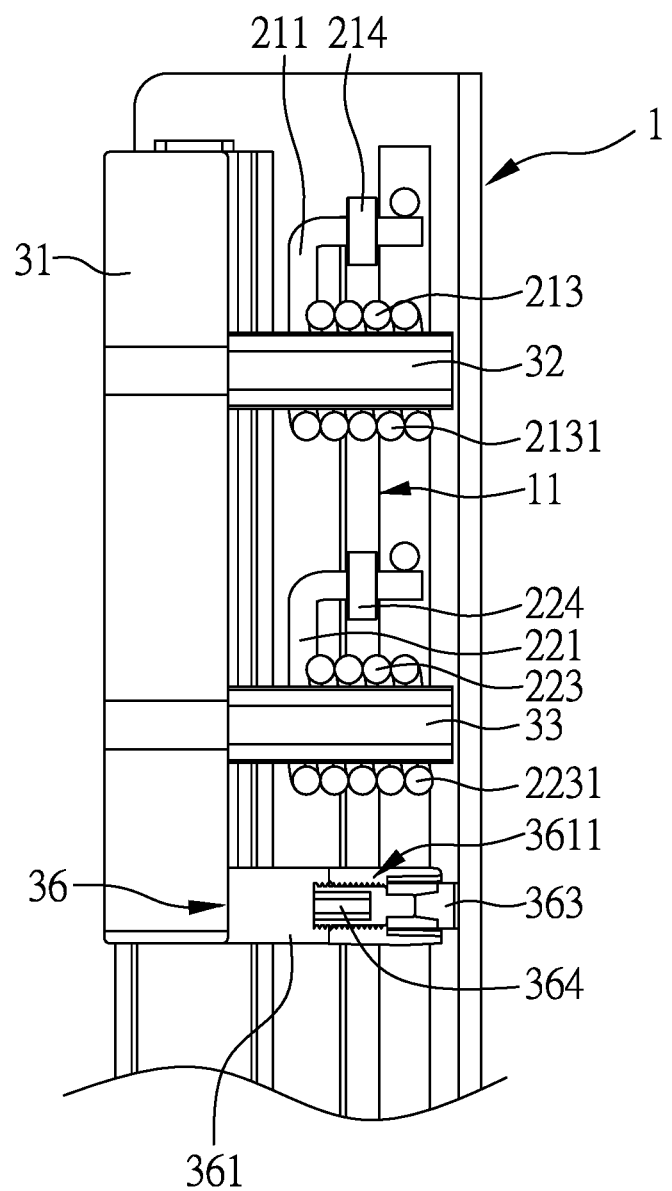
FIG. 19 is a side view of the elevatable supporting device of the seventh embodiment of the present invention.

Refer to FIG. 19 illustrating the side partial perspective view of the elevatable supporting device 1000 of the seventh embodiment of the present invention.

The structural features of the present embodiment are similar to that of the first embodiment; however, the bearing module 3 further includes a frictional unit 36 for providing extra frictional force to stabilize the slider 31 when sliding between the highest position and the lowest position. In other words, the frictional unit 36 is disposed adjacent to the upright 1 and has a main body 361, a friction block 363 and a screw 364. The main body 361 has a through-hole 3611, the friction block 363 is disposed at the main body 361, and the screw 364 is adjustably bolted to the through-hole 3611. Wherein the screw 364 passes through the through-hole 3611 and abuts against the friction block 363 so that the friction block 363 is tightly attached to the upright 1 and provides a normal force to the upright 1. When the bearing module 3 moves, a kinetic frictional force is generated between the frictional unit 36 and the upright 1, and when the bearing module 3 stops, a static frictional force is generated between the frictional unit 36 and the upright 1. Accordingly, the bearing module 3 and the energy storage unit 2 become more stable when sliding between the highest position and the lowest position or stop at any position between the highest position and the lowest position. The users are able to adjust the screw 364 by screwing the screw 364 in or out and make the screw 364 abut the friction block 363 harder or looser for changing the normal force; thus, the maximum static frictional force and the kinetic frictional force when sliding may be changed.

The frictional unit 36 of the present embodiment may be considered as an auxiliary structure added to the elevatable supporting device of the first embodiment. The functions of the energy storage unit 2 are not affected by the frictional unit 36, but the stability of the elevatable supporting device 1000, the tolerance of stopping the display 2000 at any height, and the user's touch may be improved. The addition of the frictional unit 36 is not limited to the elevatable supporting device 1000 of the first embodiment, and the frictional unit 36 abutting the upright 1 may be added to the bearing module 3 of the elevatable supporting devices 1000 of other embodiments.

Figure 20:
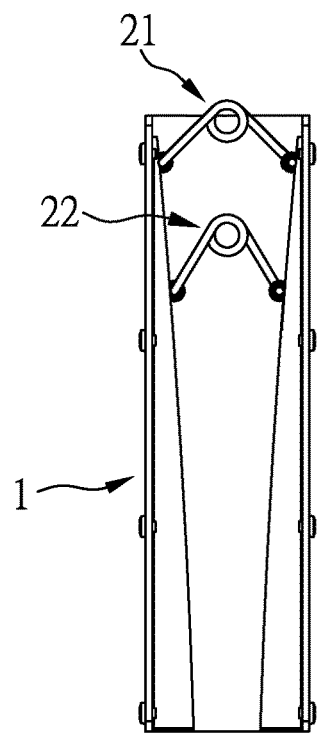
FIG. 20 is a partial view of the elevatable supporting device of the eighth embodiment of the present invention.
Figure 21:
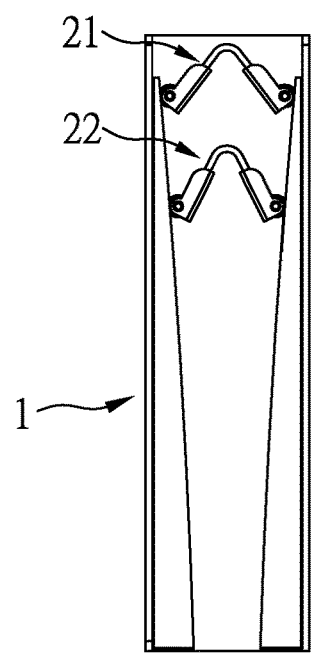
FIG. 21 is a partial view of the elevatable supporting device of the ninth embodiment of the present invention.
Figure 22:
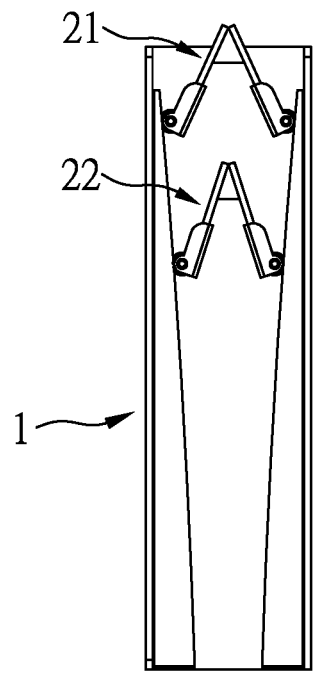
FIG. 22 is a partial view of the elevatable supporting device of the tenth embodiment of the present invention.
Figure 23:
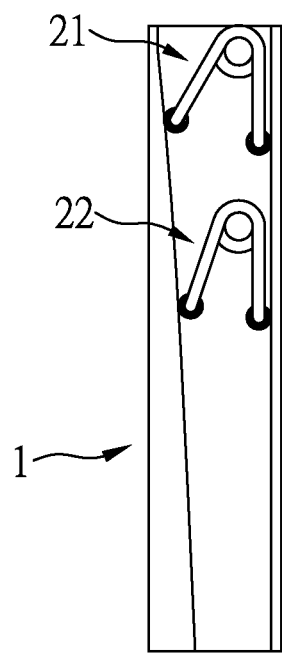
FIG. 23 is a partial view of the elevatable supporting device of the eleventh embodiment of the present invention.

FIG. 20 to FIG. 23 illustrate the eighth embodiment to the eleventh embodiment of the present invention, which comprise an upside-down energy storage unit 2 (the opening of the first included angle θ1 and the sixth included angle θ6 face downwardly). FIG. 20 shows that the torsional spring of the energy storage unit 2 of the first embodiment is disposed upside-down at the highest position in the eighth embodiment. It is clear that the energy storage unit 2 is compressed by the first sliding structure 11 and the second sliding structure 12 to provide the total effective resistance Fx when the energy storage unit 2 slides downwardly. In comparison to the first embodiment, the only difference is that the placement direction of the energy storage unit 2, the operational principle and other details remain the same. The ninth embodiment illustrated in FIG. 21 shows that the V-shaped elastic steel plate of the energy storage unit 2 of the third and the fourth embodiment is disposed upside-down. The tenth embodiment illustrated in FIG. 22 shows that the flat springs, the first connecting section 213, and the second connecting section 223 of the energy storage unit 2 of the fifth embodiment is disposed upside-down. The eleventh embodiment illustrated in FIG. 23 shows that the torsional spring of the energy storage unit 2 of the sixth embodiment is disposed upside-down.

The operation principle of the upside-down energy storage unit 2 is similar to the original energy storage unit 2.

When the energy storage unit 2 moves from the highest position to the lowest position, the first included angle θ1 between the first arm 211 and the second arm 212 of the first energy storage element 21 continuously decreases so that the first resistance F1 and the second resistance F2 continuously increase and at least one of the second included angle θ2 and the fourth included angle θ4 may continuously decrease, and the sixth included angle θ6 between the third arm 221 and the fourth arm 222 of the second energy storage element 22 continuously decreases so that the third resistance F3 and the fourth resistance F4 continuously increase and at least one of the seventh included angle θ7 and the eighth included angle θ8 continuously decrease in order to maintain the total effective resistance Fx. When the energy storage unit 2 moves from the lowest position to the highest position, the first included angle θ1 continuously increases so that the first resistance F1 and the second resistance F2 continuously decrease and at least one of the second included angle θ2 and the fourth included angle θ4 continuously increase, and the sixth included angle θ6 continuously increases so that the third resistance F3 and the fourth resistance F4 continuously decrease and at least one of the seventh included angle θ7 and the eighth included angle θ8 continuously increase in order to maintain the total effective resistance Fx.

In summary, according to the elevatable supporting device of the present invention, the change of the included angle between the arms of each of the energy storage elements and the two inclined surfaces makes the dividing forces of each resistance generated from the highest position to the lowest position become almost the same. Hence, a constant supporting force along the first axis to support the bearing module and the display may be provided so that the display may stop at any position between the highest position and the lowest position. In comparison to the prior art, the energy storage elements utilized in the elevatable supporting device in the present invention is advantageous of lower accuracy requirement of components, simple operational principle, stable, and long-life.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An elevatable supporting device for bearing a display, the elevatable supporting device comprising:
   an upright extending along a first axis and including an accommodating space, a first sliding structure, and a second sliding structure non-parallel to the first sliding structure, wherein the accommodating space is formed between the first sliding structure and the second sliding structure, the first sliding structure includes a first sliding surface and a third sliding surface, the second sliding structure includes a second sliding surface and a fourth sliding surface, and a highest position and a lowest position are defined on the first axis;
   an energy storage unit being movably disposed in the accommodating space and abutting against the first sliding structure and the second sliding structure, the energy storage unit at least including:
      a first energy storage element having a first connecting section, a first arm extending from the first connecting section and providing a first resistance, and a second arm extending from the first connecting section and providing a second resistance; and
      a second energy storage element having a second connecting section, a third arm extending from the second connecting section and providing a third resistance, and a fourth arm extending from the second connecting section and providing a fourth resistance; and
   a bearing module connecting to the display and the energy storage unit and sliding back and forth along the first axis with respect to the upright;
   wherein a first included angle is defined between the first arm and the second arm, a second included angle is defined between the first arm and the first sliding surface, a third included angle is defined between the first sliding surface and the first axis, a fourth included angle is defined between the second arm and the second sliding surface, a fifth included angle is defined between the second sliding surface and the first axis, a sixth included angle is defined between the third arm and the fourth arm, a seventh included angle is defined between the third arm and the third sliding surface, an eighth included angle is defined between the fourth arm and the fourth sliding surface, a ninth included angle is defined between the third sliding surface and the first axis, and a tenth included angle is defined between the fourth sliding surface and the first axis, wherein the third included angle is constant and smaller than the first included angle, the ninth included angle is constant and smaller than the sixth included angle, the fifth included angle is constant and smaller than the first included angle, the tenth included angle is constant and smaller than the sixth included angle, and the sixth included angle is smaller than the first included angle;
   wherein when the energy storage unit moves from the highest position to the lowest position, the first included angle and the sixth included angle continuously decrease so that the first resistance, the second resistance, the third resistance, and the fourth resistance continuously increase, at least one of the second included angle and the fourth included angle continuously decreases, and at least one of the seventh included angle and the eighth included angle continuously decreases, conversely, when the energy storage element moves from the lowest position to the highest position, the first included angle and the sixth included angle continuously increase so that the first resistance, the second resistance, the third resistance, and the fourth resistance continuously decrease, at least one of the second included angle and the fourth included angle continuously increases, and at least one of the seventh included angle and the eighth included angle continuously increases; and thereby, a total effective resistance on the first axis is substantially constant, wherein when an external force is applied, the energy storage unit, the bearing module, and the display move simultaneously; and when the external force is removed, the energy storage element, the bearing module, and the display are in a static equilibrium status so that the display is able to stop at any position between the highest position and the lowest position.

2. The elevatable supporting device as claimed in claim 1, wherein a first interval on a second axis perpendicular to the first axis is defined between the first sliding surface and the second sliding surface, and a second interval on the second axis is defined between the third sliding surface and the fourth sliding surface, wherein a width of the first interval and a width of the second interval continuously decrease from the highest position to the lowest position.

3. The elevatable supporting device as claimed in claim 2, wherein a projected length of the first arm and a projected length of the third arm that projected on the first axis continuously increase from the highest position to the lowest position.

4. The elevatable supporting device as claimed in claim 3, wherein the first resistance forms a first effective resistance on the first axis, the second resistance forms a second effective resistance on the first axis, the third resistance forms a third effective resistance on the first axis, and the fourth resistance forms a fourth effective resistance on the first axis, wherein the total effective resistance comprises the first effective resistance, the second effective resistance, the third effective resistance, and the fourth effective resistance.

5. The elevatable supporting device as claimed in claim 4, wherein the first energy storage element has a first follower disposed on the first arm and a second follower disposed on the second arm, and the second energy storage element has a third follower disposed on the third arm and a fourth follower disposed on the fourth arm, wherein the first follower and the third follower contact with the first sliding surface and the third sliding surface respectively, and the second follower and the fourth follower contact with the second sliding surface and the fourth sliding surface respectively.

6. The elevatable supporting device as claimed in claim 5, wherein the upright has a sliding module disposed along the first axis, and the bearing module connects to the sliding module to slide with respect to the upright so that the first arm and the third arm slide along the first sliding surface and the third sliding surface respectively, and the second arm and the fourth arm slide along the second sliding surface and the fourth sliding surface respectively.

7. The elevatable supporting device as claimed in claim 6, wherein the bearing module connects to the first connecting section and the second connecting section.

8. The elevatable supporting device as claimed in claim 7, wherein the first sliding surface and the second sliding surface are symmetrical with each other with respect to the first axis, and the third sliding surface and the fourth sliding surface are symmetrical with each other with respect to the first axis.

9. The elevatable supporting device as claimed in claim 7, wherein the first sliding surface and the second sliding surface are non-symmetrical with each other with respect to the first axis, and the third sliding surface and the fourth sliding surface are non-symmetrical with each other with respect to the first axis, in which the second sliding surface and the fourth sliding surface are parallel to the first axis.

10. The elevatable supporting device as claimed in claim 7, wherein the third included angle equals the ninth included angle, the fifth included angle equals the tenth included angle, the first sliding surface overlaps with the third sliding surface, and the second sliding surface overlaps with the fourth sliding surface.

11. The elevatable supporting device as claimed in claim 1, wherein the first energy storage element and the second energy storage element are integrally-formed torsion springs respectively, wherein the first connecting section has a first winding portion, and the second connecting section has a second winding portion.

12. The elevatable supporting device as claimed in claim 11, wherein the bearing module has a first shaft on which the first winding portion and the second winding portion are sleeved.

13. The elevatable supporting device as claimed in claim 11, wherein the bearing module has a first shaft on which the first winding portion is sleeved, and a second shaft on which the second winding portion is sleeved.

14. The elevatable supporting device as claimed in claim 1, wherein the first energy storage element and the second energy storage element are integrally-formed V-shaped elastic steel plates respectively.

15. The elevatable supporting device as claimed in claim 14, wherein the bearing module has a first shaft, a second shaft, a first block, and a second block, wherein the first shaft and the first connecting section are secured to the first block, and the second shaft and the second connecting section are secured to the second block.

16. The elevatable supporting device as claimed in claim 1, wherein the first connecting section and the second connecting section are supporting blocks connecting to the bearing module respectively, wherein the first arm and the second arm partially attach to the first connecting section, and the third arm and the fourth arm partially attach to the second connecting section.

17. The elevatable supporting device as claimed in claim 16, wherein the first arm, the second arm, the third arm, and the fourth arm are flat springs respectively.

18. The elevatable supporting device as claimed in claim 1, wherein the bearing module further comprises a friction unit disposed adjacent to the upright for providing a normal force towards the upright, and a kinetic friction force is generated between the friction unit and the upright when the bearing module moves with respect to the upright.

19. The elevatable supporting device as claimed in claim 18, wherein the friction unit has a friction block and a screw abutting against the friction block towards the upright so that the normal force is able to be adjusted according to an extent of the screw abutting against the friction block.

* * * * *